(12) United States Patent
Dorman et al.

(10) Patent No.: US 10,599,671 B2
(45) Date of Patent: Mar. 24, 2020

(54) CONFLICT RESOLUTION, RETRY CONDITION MANAGEMENT, AND HANDLING OF PROBLEM FILES FOR THE SYNCHRONIZATION CLIENT TO A CLOUD-BASED PLATFORM

(71) Applicant: Box, Inc., Los Altos, CA (US)

(72) Inventors: Griffin Dorman, San Francisco, CA (US); Florian Jourda, San Francisco, CA (US); Kunal Parmar, San Jose, CA (US); Dave Sawyer, Mountain View, CA (US); Ben Smith, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 14/158,626

(22) Filed: Jan. 17, 2014

(65) Prior Publication Data

US 2014/0201145 A1    Jul. 17, 2014

Related U.S. Application Data

(60) Provisional application No. 61/753,761, filed on Jan. 17, 2013.

(51) Int. Cl.
| | | |
|---|---|---|
| *G06F 17/30* | (2006.01) | |
| *G06F 16/27* | (2019.01) | |
| *G06F 16/178* | (2019.01) | |

(52) U.S. Cl.
CPC ............ *G06F 16/27* (2019.01); *G06F 16/178* (2019.01)

(58) Field of Classification Search
CPC ......... G06F 17/30011; G06F 17/30091; G06F 17/30174; G06F 17/30575;
(Continued)

(56) References Cited

U.S. PATENT DOCUMENTS

| 858,619 A | 7/1907 | O'Farrell |
| 5,043,876 A | 8/1991 | Terry |

(Continued)

FOREIGN PATENT DOCUMENTS

| CA | 2724521 | 11/2009 |
| CN | 101997924 A | 3/2011 |

(Continued)

OTHER PUBLICATIONS

Exam Report for GB1311459.0 Applicant: Box, Inc. dated Aug. 19, 2013, 6 pages.

(Continued)

*Primary Examiner* — Greta L Robinson

(74) *Attorney, Agent, or Firm* — Sheridan Ross P.C.

(57) ABSTRACT

Embodiments of the present disclosure include systems and methods of conflict resolution, retry condition management and/or handling of problem files in the synchronization architecture of the cloud-based platform. One embodiment of the disclosed technology detects conflicts between incompatible changes made on opposite file systems based on file system sync results when executing a sync event on the file system. In one embodiment, the disclosed technology applies self-healing strategies when unexpected failures occur. For example, if a synchronization action fails repeatedly, an external action (e.g., from user, file system, etc.) can return the system back to a consistent state again.

19 Claims, 20 Drawing Sheets

(58) Field of Classification Search
CPC ......... G06F 17/30286; G06F 17/30309; G06F 17/30312; G06F 17/30342; G06F 17/30345; G06F 16/10; G06F 16/178; G06F 16/27; G06F 16/288; H04L 67/02; H04L 67/26; H04L 67/1097
USPC ....... 707/608, 610, 612, 613, 618, 620, 621, 707/622, 624, 634, 640, 674, 690, 691, 707/679, 617, 619, 934, 940, 641, 654, 707/655, 656, 677, 686, 687, 694, 70, 707/793, 795, 796, 802
See application file for complete search history.

(56) References Cited

U.S. PATENT DOCUMENTS

| | | |
|---|---|---|
| 5,742,905 A | 4/1998 | Pepe et al. |
| 5,748,735 A | 5/1998 | Ganesan |
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,926,816 A | 7/1999 | Bauer et al. |
| 5,999,908 A | 12/1999 | Abelow |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,279,109 B1 | 8/2001 | Brundridge |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,446,091 B1 | 9/2002 | Noren et al. |
| 6,449,622 B1 | 9/2002 | LaRue et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,080,104 B2 | 7/2006 | Ring et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,171,468 B2 | 1/2007 | Yeung et al. |
| 7,178,021 B1 | 2/2007 | Hanna et al. |
| 7,222,078 B2 | 5/2007 | Abelow |
| 7,233,997 B1 | 6/2007 | Leveridge et al. |
| 7,275,244 B1 | 9/2007 | Bell et al. |
| 7,296,025 B2 | 11/2007 | Kung et al. |
| 7,310,684 B2 | 12/2007 | Patrick et al. |
| 7,337,193 B1 | 2/2008 | Mills et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,380,120 B1 | 5/2008 | Garcia |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,653,668 B1 | 1/2010 | Shelat et al. |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,735,144 B2 | 6/2010 | Pravetz et al. |
| 7,739,411 B2 | 6/2010 | Messer et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,126,848 B2 | 2/2012 | Wagner |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,201,230 B2 | 6/2012 | Day et al. |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,447,820 B1 | 5/2013 | Gay |
| 8,458,128 B2 * | 6/2013 | Khosravy ......... G06F 17/30578 707/621 |
| 8,464,161 B2 | 6/2013 | Giles et al. |
| 8,464,167 B2 | 6/2013 | Saund et al. |
| 8,473,775 B1 | 6/2013 | Helmick et al. |
| 8,515,902 B2 | 8/2013 | Savage |
| 8,527,549 B2 | 9/2013 | Cidon |
| 8,528,087 B2 | 9/2013 | Hsu et al. |
| 8,549,066 B1 | 10/2013 | Donahue et al. |
| 8,549,511 B2 | 10/2013 | Seki et al. |
| 8,572,022 B2 | 10/2013 | Hagan et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,719,810 B2 | 5/2014 | Oh |
| 8,745,267 B2 | 6/2014 | Luecke et al. |
| 8,782,637 B2 | 7/2014 | Khalid |
| 8,819,068 B1 | 8/2014 | Knote et al. |

(56) References Cited

U.S. PATENT DOCUMENTS

| | | |
|---|---|---|
| 8,825,597 B1 | 9/2014 | Houston et al. |
| 8,849,955 B2 | 9/2014 | Prahlad et al. |
| 8,868,574 B2 | 10/2014 | Kiang et al. |
| 8,869,235 B2 | 10/2014 | Qureshi et al. |
| 8,886,925 B2 | 11/2014 | Qureshi et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,179 B2 | 2/2015 | Besen et al. |
| 8,949,939 B2 | 2/2015 | Peddada |
| 8,955,103 B2 | 2/2015 | Kline, III et al. |
| 8,956,103 B2 | 2/2015 | Gehring |
| 8,959,579 B2 | 2/2015 | Barton et al. |
| 8,966,062 B1 | 2/2015 | Giese et al. |
| 8,990,307 B2 | 3/2015 | Barreto et al. |
| 8,990,955 B2 | 3/2015 | Hymel et al. |
| 9,015,248 B2 | 4/2015 | Barreto et al. |
| 9,054,919 B2 | 6/2015 | Kiang et al. |
| 9,239,846 B2 | 1/2016 | Besen et al. |
| 9,244,934 B2 | 1/2016 | Besen et al. |
| 9,268,655 B2 | 2/2016 | Chan et al. |
| 9,396,216 B2 | 7/2016 | Barreto et al. |
| 9,396,245 B2 | 7/2016 | Mackenzie et al. |
| 9,407,664 B1 | 8/2016 | Banerjee |
| 9,495,434 B1 | 11/2016 | Walton et al. |
| 9,507,795 B2 | 11/2016 | Dorman et al. |
| 9,535,924 B2 | 1/2017 | Mackenzie et al. |
| 9,547,658 B2 | 1/2017 | Fan et al. |
| 9,553,758 B2 | 1/2017 | Rexer |
| 9,558,202 B2 | 1/2017 | Lockhart et al. |
| 9,563,517 B1 | 2/2017 | Natanzon et al. |
| 9,575,981 B2 | 2/2017 | Dorman et al. |
| 9,633,037 B2 | 4/2017 | Smith et al. |
| 9,652,741 B2 | 5/2017 | Goldberg et al. |
| 9,773,051 B2 | 9/2017 | Smith |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0073448 A1 | 4/2003 | Ozeki et al. |
| 2003/0084306 A1 | 5/2003 | Abburi et al. |
| 2003/0093404 A1 | 5/2003 | Bader et al. |
| 2003/0097374 A1 | 5/2003 | Himeno |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0003104 A1 | 1/2004 | Boskovic et al. |
| 2004/0021686 A1 | 2/2004 | Barberis |
| 2004/0076187 A1 | 4/2004 | Peled |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0162836 A1 | 8/2004 | Aronoff et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0230652 A1 | 11/2004 | Estrada et al. |
| 2004/0246532 A1 | 12/2004 | Inada |
| 2004/0260977 A1 | 12/2004 | Ji et al. |
| 2004/0267825 A1 | 12/2004 | Novak et al. |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022175 A1 | 1/2005 | Sliger et al. |
| 2005/0022229 A1 | 1/2005 | Gabriel et al. |
| 2005/0028006 A1 | 2/2005 | Leser et al. |
| 2005/0033777 A1 | 2/2005 | Moraes et al. |
| 2005/0038997 A1 | 2/2005 | Kojima et al. |
| 2005/0044108 A1* | 2/2005 | Shah ................... G06F 16/10 |
| 2005/0050073 A1* | 3/2005 | Demiroski ........ G06F 17/30174 |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097061 A1 | 5/2005 | Shapiro et al. |
| 2005/0097225 A1 | 5/2005 | Glatt et al. |
| 2005/0097434 A1 | 5/2005 | Storisteanu |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0172284 A1 | 8/2005 | Dandekar et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0223047 A1* | 10/2005 | Shah ................ G06F 17/30176 |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0155776 A1* | 7/2006 | Aust ....................... G06F 16/10 |
| 2006/0168550 A1 | 7/2006 | Muller et al. |
| 2006/0173952 A1 | 8/2006 | Coyle |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011469 A1 | 1/2007 | Allison et al. |
| 2007/0016680 A1 | 1/2007 | Burd et al. |
| 2007/0028291 A1 | 2/2007 | Brennan et al. |
| 2007/0038934 A1 | 2/2007 | Fellman |
| 2007/0049243 A1* | 3/2007 | Voss ....................... H04W 24/00 |
| | | 455/405 |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0142039 A1 | 6/2007 | Bushnell et al. |
| 2007/0157203 A1 | 7/2007 | Lim |

(56) References Cited

U.S. PATENT DOCUMENTS

| | | |
|---|---|---|
| 2007/0162518 A1* | 7/2007 | Tian ............. H04L 9/0838 |
| 2007/0162610 A1 | 7/2007 | Un et al. |
| 2007/0179993 A1 | 8/2007 | Arruza |
| 2007/0185885 A1 | 8/2007 | Tamura |
| 2007/0195779 A1 | 8/2007 | Judge et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0281707 A1* | 12/2007 | Thomson ............ H04W 8/12 455/446 |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059474 A1 | 3/2008 | Lim |
| 2008/0059656 A1 | 3/2008 | Saliba et al. |
| 2008/0060080 A1 | 3/2008 | Lim |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243846 A1 | 10/2008 | Rasmussen |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0281972 A1 | 11/2008 | Gupta et al. |
| 2008/0294899 A1 | 11/2008 | Gazzetta et al. |
| 2008/0306900 A1 | 12/2008 | Tamura |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0097374 A1 | 4/2009 | Shoji et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276660 A1 | 11/2009 | Griffith et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1* | 12/2009 | Lukiyanov ........ G06F 17/30038 |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1* | 4/2010 | Caldwell .......... G06Q 10/06316 705/7.16 |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0154025 A1 | 6/2010 | Esteve Balducci et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185582 A1* | 7/2010 | Alam .................. G06F 8/61 707/609 |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0262953 A1 | 10/2010 | Barboni et al. |
| 2010/0267588 A1 | 10/2010 | Nelson et al. |
| 2010/0269164 A1 | 10/2010 | Sosnosky et al. |
| 2010/0274765 A1 | 10/2010 | Murphy et al. |
| 2010/0274772 A1 | 10/2010 | Samuels |

(56) References Cited

U.S. PATENT DOCUMENTS

| | | |
|---|---|---|
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332818 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0138479 A1 | 6/2011 | Jain et al. |
| 2011/0142410 A1 | 6/2011 | Ishii |
| 2011/0145187 A1* | 6/2011 | Himmelsbach ... G06F 17/30578 707/610 |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0218964 A1* | 9/2011 | Hagan ............... G06F 17/30581 707/626 |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0264621 A1 | 10/2011 | Burjoski |
| 2011/0276683 A1 | 11/2011 | Goldschlag et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0295798 A1 | 12/2011 | Shain |
| 2011/0296022 A1 | 12/2011 | Ferris et al. |
| 2011/0313803 A1 | 12/2011 | Friend et al. |
| 2011/0314145 A1 | 12/2011 | Raleigh et al. |
| 2011/0320197 A1 | 12/2011 | Conejero et al. |
| 2011/0320936 A1 | 12/2011 | Mohan et al. |
| 2012/0030187 A1 | 2/2012 | Marano et al. |
| 2012/0036370 A1 | 2/2012 | Lim et al. |
| 2012/0057696 A1 | 3/2012 | Chew |
| 2012/0064879 A1 | 3/2012 | Panei |
| 2012/0079095 A1 | 3/2012 | Evans et al. |
| 2012/0089610 A1 | 4/2012 | Agrawal et al. |
| 2012/0089659 A1 | 4/2012 | Halevi et al. |
| 2012/0089710 A1 | 4/2012 | Rakowski et al. |
| 2012/0096521 A1 | 4/2012 | Peddada |
| 2012/0101995 A1 | 4/2012 | Agetsuma et al. |
| 2012/0108200 A1 | 5/2012 | Rubin et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1 | 7/2012 | Narasimhan et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0206653 A1 | 8/2012 | Graves et al. |
| 2012/0207449 A1 | 8/2012 | Angquist et al. |
| 2012/0209815 A1 | 8/2012 | Carson et al. |
| 2012/0209889 A1 | 8/2012 | Agnoli et al. |
| 2012/0214444 A1 | 8/2012 | McBride et al. |
| 2012/0216242 A1 | 8/2012 | Uner et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0311499 A1 | 12/2012 | Dellinger et al. |
| 2012/0317239 A1 | 12/2012 | Mulder et al. |
| 2012/0317487 A1 | 12/2012 | Lieb et al. |

(56) References Cited

U.S. PATENT DOCUMENTS

| | | |
|---|---|---|
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1 | 2/2013 | Chakraborty et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0073621 A1 | 3/2013 | Waddoups et al. |
| 2013/0080765 A1 | 3/2013 | Mohanty et al. |
| 2013/0080919 A1 | 3/2013 | Kiang et al. |
| 2013/0110565 A1 | 5/2013 | Means, Jr. et al. |
| 2013/0110961 A1 | 5/2013 | Jadhav |
| 2013/0117226 A1* | 5/2013 | Jain ................... G06F 17/30008 707/625 |
| 2013/0117337 A1 | 5/2013 | Dunham |
| 2013/0117376 A1 | 5/2013 | Filman et al. |
| 2013/0124458 A1 | 5/2013 | Barreto et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0151690 A1 | 6/2013 | Shah et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179947 A1 | 7/2013 | Kline, III et al. |
| 2013/0185347 A1 | 7/2013 | Romano |
| 2013/0185452 A1 | 7/2013 | Burckart et al. |
| 2013/0185558 A1 | 7/2013 | Seibert et al. |
| 2013/0191339 A1* | 7/2013 | Haden ................ G06F 17/3007 707/638 |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0219176 A1 | 8/2013 | Akella et al. |
| 2013/0226876 A1* | 8/2013 | Gati ................. G06F 17/30079 707/652 |
| 2013/0227522 A1 | 8/2013 | Lerum et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0254699 A1 | 9/2013 | Bashir et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0268999 A1 | 10/2013 | Kiang et al. |
| 2013/0275398 A1 | 10/2013 | Dorman et al. |
| 2013/0275429 A1 | 10/2013 | York et al. |
| 2013/0275509 A1* | 10/2013 | Micucci ............ G06F 17/30174 709/204 |
| 2013/0282830 A1 | 10/2013 | Besen et al. |
| 2013/0283106 A1 | 10/2013 | King et al. |
| 2013/0304679 A1 | 11/2013 | Fleming et al. |
| 2013/0304694 A1 | 11/2013 | Barreto et al. |
| 2013/0304697 A1 | 11/2013 | Movida |
| 2013/0305039 A1 | 11/2013 | Gauda |
| 2013/0325803 A1 | 12/2013 | Akirav et al. |
| 2013/0326344 A1 | 12/2013 | Masselle et al. |
| 2014/0006357 A1 | 1/2014 | Davis et al. |
| 2014/0006465 A1 | 1/2014 | Davis et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0033324 A1 | 1/2014 | Kiang et al. |
| 2014/0040182 A1 | 2/2014 | Gilder et al. |
| 2014/0040206 A1 | 2/2014 | Ramakrishnan et al. |
| 2014/0047509 A1 | 2/2014 | Bhogal et al. |
| 2014/0052939 A1 | 2/2014 | Tseng et al. |
| 2014/0059002 A1 | 2/2014 | Lockhart et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082071 A1 | 3/2014 | Rexer |
| 2014/0149461 A1 | 5/2014 | Wijayaratne et al. |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0172783 A1 | 6/2014 | Suzuki et al. |
| 2014/0172799 A1 | 6/2014 | Dorman |
| 2014/0188798 A1 | 7/2014 | Mackenzie et al. |
| 2014/0195485 A1 | 7/2014 | Dorman |
| 2014/0201138 A1 | 7/2014 | Dorman et al. |
| 2014/0215303 A1 | 7/2014 | Grigorovitch et al. |
| 2014/0230011 A1 | 8/2014 | Drewry et al. |
| 2014/0244600 A1 | 8/2014 | Schmidt et al. |
| 2014/0258350 A1 | 9/2014 | Duval et al. |
| 2014/0280605 A1 | 9/2014 | Zhang |
| 2014/0337291 A1 | 11/2014 | Dorman et al. |
| 2014/0337482 A1 | 11/2014 | Houston et al. |
| 2014/0337491 A1 | 11/2014 | Barreto et al. |
| 2014/0344456 A1 | 11/2014 | Buzbee et al. |
| 2014/0359085 A1 | 12/2014 | Chen |
| 2014/0359286 A1 | 12/2014 | Wen et al. |
| 2014/0372376 A1 | 12/2014 | Smith et al. |
| 2014/0379647 A1 | 12/2014 | Smith et al. |
| 2014/0379760 A1 | 12/2014 | Martin et al. |
| 2015/0019723 A1 | 1/2015 | Kweon et al. |
| 2015/0039556 A1 | 2/2015 | Mackenzie et al. |
| 2015/0154156 A1 | 6/2015 | Meyers, Jr. et al. |
| 2015/0186668 A1 | 7/2015 | Whaley et al. |
| 2015/0237406 A1 | 8/2015 | Ochoa et al. |
| 2015/0339113 A1 | 11/2015 | Dorman et al. |
| 2016/0065672 A1 | 3/2016 | Savage et al. |
| 2016/0350326 A1 | 12/2016 | Simonetti |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |

(56) References Cited

FOREIGN PATENT DOCUMENTS

| WO | WO-2012167272 A1 | 12/2012 |
|---|---|---|
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

"Dropbox: Sync only specific folders," posted on Feb. 9, 2012, available online at http://www.tech-recipes.com/rx/20865/dropbox-sync-only-specific-folders/, 4 pages.
Exam Report for GB1220644.7 Applicant: Box, Inc. dated May 1, 2015, 4 pages.
Invens, "Using and Troubleshooting Offline Files," Jun. 23, 2002, Windows IT Pro, pp. 1-5.
Invens, "Using and Troubleshooting Offline Files," Jun. 23, 2002, Windows IT Pro, Figures 1 and 2, 2 pages.
"How-to Geek, How to Sync Specific Folders With Dropbox," originally written on Jun. 20, 2010 and archived version retrieved from WaybackMachine as published online on Jun. 4, 2010 at http://www.howtogeek.com/howto/18285/sync-specific-folders-with-dropbox, 7 pages.
Exam Report for GB1410569.6 Applicant: Box, Inc. dated Jul. 11, 2014, 9 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
"Average Conversion Time for a D60 RAW file?" http://www.dpreview.com, Jul. 22, 2002, 4 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the Internet, http://web. Archive.org/web, 3 pages.
"Tulsa TechFest 2012—Agenda," retrieved from the website, http://web.archive.org, Oct. 2, 2012, 2 pages.
Burns, "Developing Secure Mobile Applications for Android," Oct. 2008, Version 1.0, 1-28 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. dated May 26, 2014, 6 pages.
Exam Report for EP13185269.1, Applicant: Box, Inc. dated Jan. 28, 7 pages.
Exam Report for GB1308842.2, Applicant: Box, Inc. dated Mar. 10, 2014, 4 pages.
Exam Report for GB1312264.3, Applicant: Box, Inc. dated Mar. 24, 2014, 7 pages.
Exam Report for GB1314771.5, Applicant: Box, Inc. dated Feb. 17, 2014, 7 pages.
Exam Report for GB1318792.7, Applicant: Box, Inc. dated May 22, 2014, 2 pages.
International Search Report and Written Opinion for PCT/US2013/034765, Applicant: Box, Inc., dated Jan. 20, 2014, 15 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. dated May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. dated Feb. 7, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. dated Jun. 4, 2013, 8 pages.
Exam Report for EP13168784.0, Applicant: Box, Inc. dated Nov. 21, 2013, 7 pages.
Exam Report for GB1300188.8, Applicant: Box, Inc. dated May 31, 2013, 8 pages.

(56) References Cited

OTHER PUBLICATIONS

Exam Report for GB1306011.6, Applicant: Box, Inc. dated Apr. 18, 2013, 8 pages.
Exam Report for GB1309209.3, Applicant: Box, Inc. dated Oct. 30, 2013, 11 pages.
Exam Report for GB1310666.1, Applicant: Box, Inc. dated Aug. 30, 2013, 10 pages.
Exam Report for GB1311417.8, Applicant: Box, Inc. dated Dec. 20, 2013, 5 pages.
Exam Report for GB1312095.1, Applicant: Box, Inc. dated Dec. 12, 2013, 7 pages.
Exam Report for GB1312874.9, Applicant: Box, Inc. dated Dec. 20, 2013, 11 pages.
Exam Report for GB1313559.5, Applicant: Box, Inc., dated Aug. 22, 2013, 19 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1320902.8, Applicant: Box, Inc. dated Dec. 20, 2013, 4 pages.
Gedymin, "Cloud computing with an emphasis on Google App Engine," Master Final Project, Sep. 2011, 146 pages.
Google Docs, http://web. Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/035404, Applicant: Box, Inc., dated Jun. 26, 2013, 13 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Patent Court Document of Approved Judgment for GB0602349.3 and GB0623571.7; Mar. 3, 2009, 17 pages.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Ivens, "Using and Troubleshooting Offline Files," Jun. 23, 2002, Windows IT Pro, Figure 1.
Ivens, "Configuring Offline Files," Apr. 21, 2002, Windows IT Pro, pp. 1-5.
Exam Report for GB1316532.9, Applicant: Box, Inc. dated Mar. 27, 2015, 6 pages.
Burney, "How to Move Document from Your Computer to Your iPad and Back Again," May 31, 2011, 3 pages.
Exam Report for GB1413461.3, Applicant: Box, Inc. dated Aug. 21, 2015, 6 pages.
Fu et al., "Efficient and Fine-Grained Sharing of Encrypted Files," Quality of Service (IWQos), 2010 18th International Workshop on year 2010, pp. 1-2.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. dated Feb. 17, 2015, 6 pages.
Exam Report for GB1312264.3, Applicant: Box, Inc. dated Jan. 30, 2015, 5 pages.
Exam Report for GB1312874.9, Applicant: Box, Inc. dated Feb. 10, 2015, 7 pages.
Exam Report for GB1316685.5, Applicant: Box, Inc. dated Feb. 17, 2015, 5 pages.
Exam Report for EP 13185269.1, Applicant: Box, Inc. dated Feb. 13, 2015, 8 pages.
Exam Report for GB1316532.9; Applicant: Box, Inc., dated Mar. 8, 2016, 3 pages.
Exam Report for GB1309209.3 Applicant: Box, Inc. dated Jan. 19, 2015, 6 pages.
Cicnavi, "Offline Files in XP," Nov. 29, 2010, UtilizeWindows, pp. 1-6.
Kretzschmar et al., "Functional Components for a Security Manager within Future Inter-Cloud environments," Copyright 2011 IEEE, 5 pages.
Li et al., "CloudVO: Building a Secure Virtual Organization for Multiple Clouds Collaboration," Copyright 2010 IEEE, 6 pages.
Mont et al., "Risk Assessment and Decision Support for Security Policies and Related Enterprise Operational Processes," Copyright 2011 IEEE, 4 pages.
TaheriMonfared et al., "Monitoring Intrusions and Security Breaches in Highly Distributed Cloud Environments," Copyright 2011 IEEE, 6 pages.
Vimercati et al., "Managing and Accessing Data in the Cloud: Privacy Risks and Approaches," Copyright 2012 CRiSIS, 9 pages.
Wang et al., "Data Leakage Mitigation for Discretionary Access Control in Collaboration Clouds," Copyright 2011 ACM, 10 pages.

(56) References Cited

OTHER PUBLICATIONS

Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for Smart Board Software for Windows, published Dec. 2004, 90 pages.
Zambonini et al., "Automated Measuring of Interaction with User Interfaces," Published as WO2007113573 Oct. 2007, 19 pages.

\* cited by examiner

CONFLICT RESOLUTION, RETRY CONDITION MANAGEMENT, AND HANDLING OF PROBLEM FILES FOR THE SYNCHRONIZATION CLIENT TO A CLOUD-BASED PLATFORM

CROSS-REFERENCE TO RELATED APPLICATIONS

This application claims priority to and benefit from U.S. Provisional Patent Application Ser. No. 61/753,761 titled "CONFLICT RESOLUTION, RETRY CONDITION MANAGEMENT AND HANDLING OF PROBLEM FILES FOR THE SYNCHRONIZATION CLIENT TO A CLOUD-BASED PLATFORM" filed on Jan. 17, 2013, the entire content of which is expressly incorporated by reference herein.

BACKGROUND

Content such as audio/video files, documents or email messages can be synced between a cloud server and a user device. The syncing occurs when a new content arrives at the server, or when a user makes a request. Syncing can result in new content, updated content and/or deleted content. Conflicts can arise when the same copy of data is accessible at the cloud server and the user device. In the prior art, approaches to conflict management focus on avoiding or preventing conflicts by utilizing conflict avoidance techniques such as check in-check out procedures, file locks, etc.

DETAILED DESCRIPTION

Figure 1:
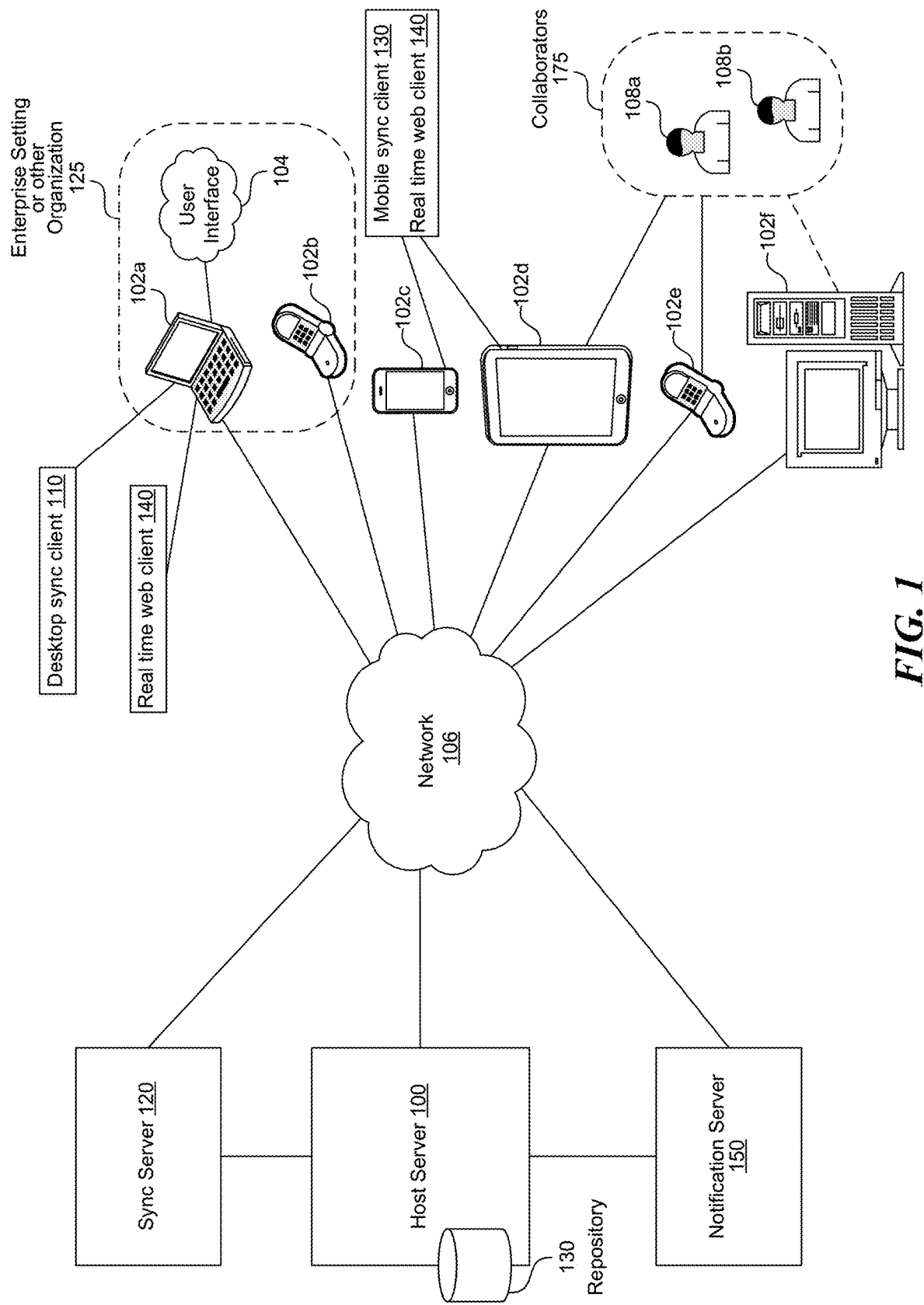
FIG. 1 illustrates an example diagram of a system having a host server of a cloud-enabled platform able to facilitate synchronization and conflict resolution among sync clients on user devices and corresponding sync server and/or host server.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

1. Overview

Embodiments of the present disclosure include systems and methods of conflict resolution, retry condition management and handling of problem files for a synchronization client (hereinafter "sync client") to a cloud-based platform such as a cloud-based collaboration platform.

One of the biggest challenges in synchronization (or sync) is handling conflicts between incompatible changes made on opposite file systems. For instance, one user may delete a folder while another user edits a file inside that folder. These two incompatible changes create conflicts that need to be resolved. Embodiments of the disclosed system and methods allow handling of such conflicts such that the expected final state of the file system is correct and the file system is resilient in the face of unexpected failures.

In one embodiment, the disclosed system applies self-healing strategies when unexpected failures occur to achieve resilience. For example, if a sync action fails repeatedly for a reason the sync client does not understand, it is possible that some external action (e.g., user, file system, or the like) could return the file system back to a consistent state again. Resilience is also attained by limiting opportunity for unexpected interactions to occur, such as minimizing the window for race conditions.

In one embodiment, the synchronization architecture detects conflict situations based on the file system synchronization result (e.g., failure reason) when executing a synchronization event on the file system (fs). In general, there is no attempt to determine potential conflicts upfront (say from currently queued events) since any calculation may be irrelevant by the time the resolving actions are performed, so to minimize this race condition window, conflicts are resolved reactively.

In one embodiment, the (fs, event type, failure reason) triple can be mapped to a specific conflict resolver which 'repairs' the file system back to a consistent state. An example list of failure reasons (e.g., conflict related ones listed below) include:

```
ITEM_NOT_FOUND
ITEM_NAME_IN_USE
ITEM_NAME_NOT_VALID
ITEM_NAME_TOO_LONG
ITEM_LOCKED
VERSION_MISMATCH (old_value check failed)
```

For example, when executing a local EDIT on the cloud server (e.g., cloud-based platform server or cloud-based collaboration platform server), if the checksum of the file has changed then the cloud server can return a VERSION_MISMATCH as a failure reason. The implication is that the file was modified by another user or through the web application. In this case, the conflict resolver can make a forked copy of the changed file so as not to lose any user data.

There are a number of conflict resolvers that can be used to support conflict use cases like these. For example:

```
RETRY_IMMEDIATELY with FORCE_UPDATE
IGNORE EVENT (i.e., treat as SUCCESS)
LOCAL COPY FILE
CLOUD SERVER RESTORE ITEM
LOCAL RESTORE ITEM
```

The conflict resolver can perform certain actions on one of the file systems to restore the file system back to a consistent state. The failed synchronization event can then be directed to retry under various conditions such as, but not limited to:

```
RETRY_ON_ITEM_UPDATE (another event comes in that updates the item)
RETRY_ON_WAIT (wait some period of time and try again)
```

In general, the synchronization strategy is to get the file systems back to a consistent state as much as possible. For instance, if an UNEXPECTED_ERROR occurs the synchronization client can wait a short time and re-execute the synchronization event, since the failure could be of an unrecognized transient nature. If the error persists, it will eventually be marked as a permanent failure and no further retry attempts are made. If somehow the system gets stuck and it is not able to do so, then logs can be sent to the servers for analysis.

In an example embodiment of the disclosed conflict resolver, the following rules may be implemented to minimize the possibility of unforeseen interaction side effects:

(1) Only one synchronization event for a given item (identified by item_id or another identifier) is executed at one time from a single synchronization event queue. This can be implemented by a skip filter on top of the in-progress items in get_next_sync_event( ) call.

(2) Only one conflict resolver is executed at a time. This can be implemented as critical section around the failure recovery manager execution (this is helpful to minimize the unforeseen in case of multiple resurrects in folder delete conflict).

An embodiment of the synchronization architecture (e.g., sync client 400 in FIG. 4B and sync server 120 in FIG. 4C) employs 'self-healing' as a method to support resolution of synchronization failures across file systems. This means that when synchronization failures happen, an attempt is made to fix the local issue, and the system is then left to self-correct back to a healthy state. This has many advantages because it simplifies the scope of certain failure resolutions and leverages the natural mechanism of returning to a healthy state through retrying the failed operation (at a later time) when a specified condition is satisfied.

The Retry Condition Manager is a component responsible for managing the evaluation of retry conditions and directing the re-execution of synchronization events when the associated retry condition is satisfied. The component has, for instance, the following properties:

(1) Flexible. Ability to accommodate a wide range of possible retry conditions, both current as well as possible future conditions.

(2) Extensible. Ability to add-in new retry conditions without requiring modification to existing design or code.

(3) Configurable. Conditions are configurable so it can be determined how repair and recover works, and easy to tune for better results.

An example set of retry conditions based on analyzing the synchronization failure mode and retry strategy, includes but is not limited to:

1. Retry on Communication Failure (e.g., network goes down)

2. Retry on Authentication Failure (e.g., auth token expired)

3. Retry on Wait Time (e.g., inode mismatch, wait N seconds and retry)

4. Retry on Update (e.g., wait for an updated name change and retry)

5. Retry on Rate Limit Failure (e.g., rate limit—add delay before retry)
6. Retry on Quota Failure (e.g., wait for more quota to increase before retry)

Some of the conditions can represent global failures which need to be coordinated across other synchronization components. For instance, a communication failure should suspend the Sync Execution Controller from trying to execute any new synchronization events. Other conditions are local to a particular synchronization event, such as waiting for an update to the related item before retrying the synchronization event.

2. Example Environment

FIG. 1 illustrates an example diagram of a system having a host server 100 of a cloud-enabled platform able to facilitate synchronization and conflict resolution among remote clients (e.g., clients 110, 130, 140) at client devices 102 corresponding sync server 120 and/or host server 100.

The client devices 102 (identified individually as client devices 102a-102f) can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and notification server 150 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100), any remote environment, or other types of services including any type of cloud-based service or storage environment.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108a, 108b) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
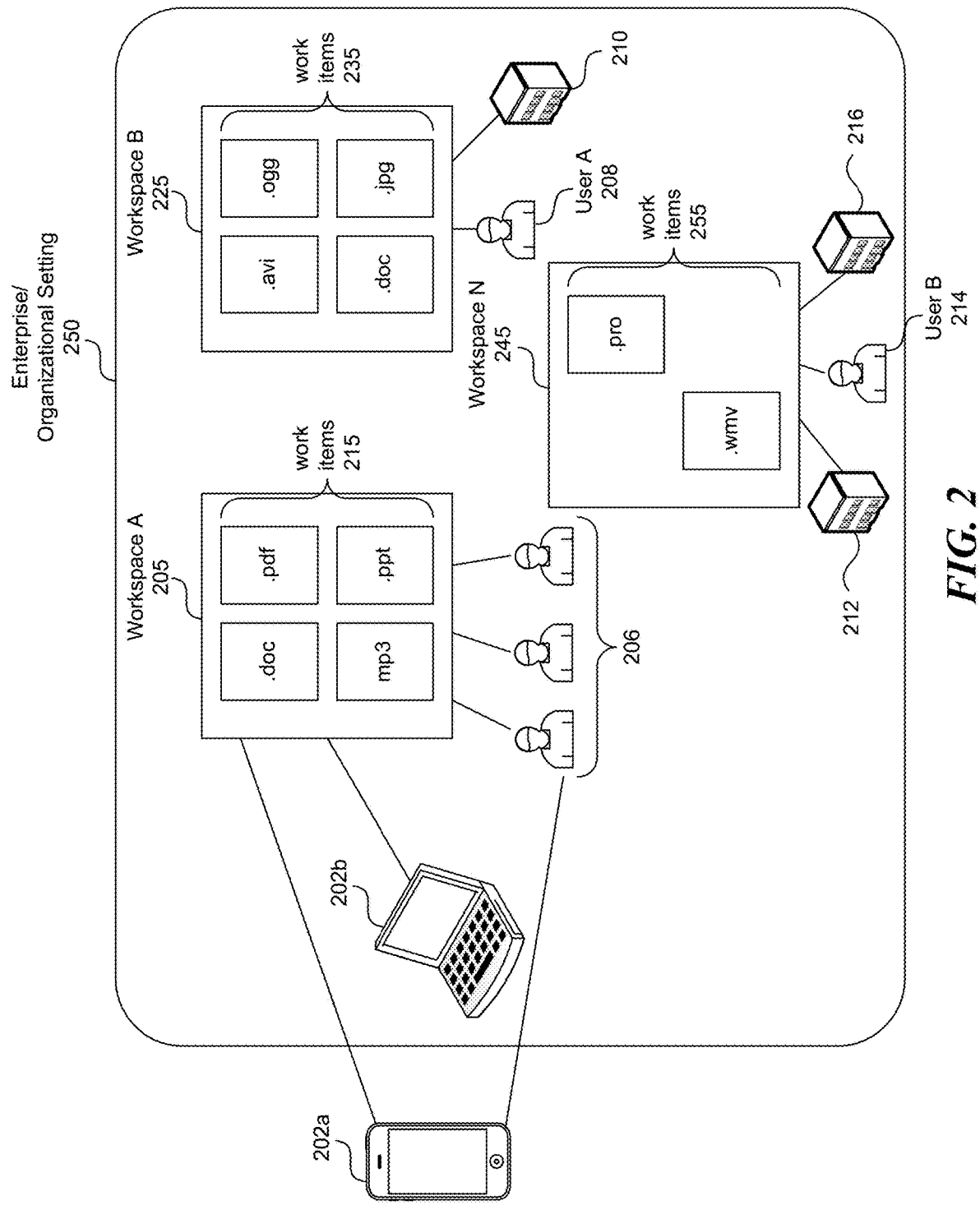
FIG. 2 illustrates a diagrammatic illustration of the cloud-based environment (e.g., collaboration environment) and the relationships between workspaces and users/collaborators

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

Because multiple users collaborate in the cloud-based environment hosted by server 100, user devices 102 need to be appropriately updated such that the most current versions of data/content are synchronized with the relevant user devices and that notification of events are sent to the relevant devices/users in a timely and orderly fashion. Similarly local changes to files and folders need to be synced with files and folders in the cloud server, so that up to date content is accessible from the cloud server. Any given user can utilize any number of clients and any number of types of clients (e.g., sync client, real time web client, mobile sync client, mobile application, email client, server sync client, etc.) at any given time. When syncing items between opposing file systems (e.g., local and remote file systems), conflicts can arise when changes made at the local or server level are incompatible. The disclosed system and methods can recognize and resolve such conflicts to restore the file system to a consistent state and then retry syncing under various conditions. Thus, the host server 100 and sync components further shown and described in FIGS. 3 and 4A-4D facilitate conflict resolution, retry condition management and/or handling of problem files for the sync client to a cloud-based platform.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), private WAN, a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration environment hosted by a cloud-based platform deployed or accessed by an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set a permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
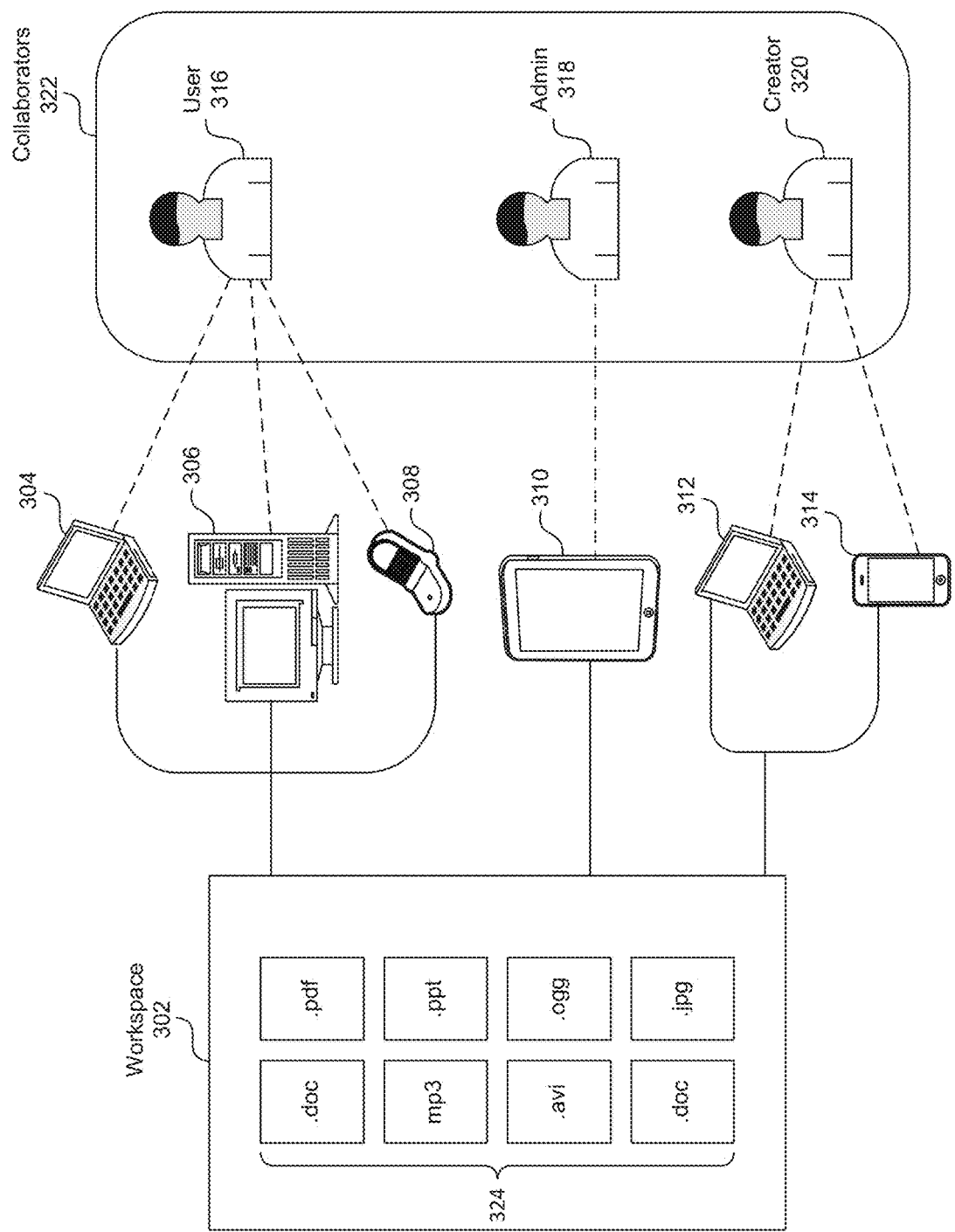
FIG. 3 illustrates a diagrammatic illustration of a workspace having multiple work items with which collaborators can access through multiple devices.

FIG. 3 depicts an example diagram of a workspace 302 in a cloud-based platform such as an online, web-based or desktop collaboration environment accessible by multiple collaborators 322 through various devices via a web interface, mobile client, or desktop client.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302 in accordance with the platform and/or application independent mechanisms disclosed herein. Users can also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities, sync results, errors, or the like can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same work space), either in the same work space 302 or in some other work space. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant work spaces, in the same user interface.

Figure 4A:
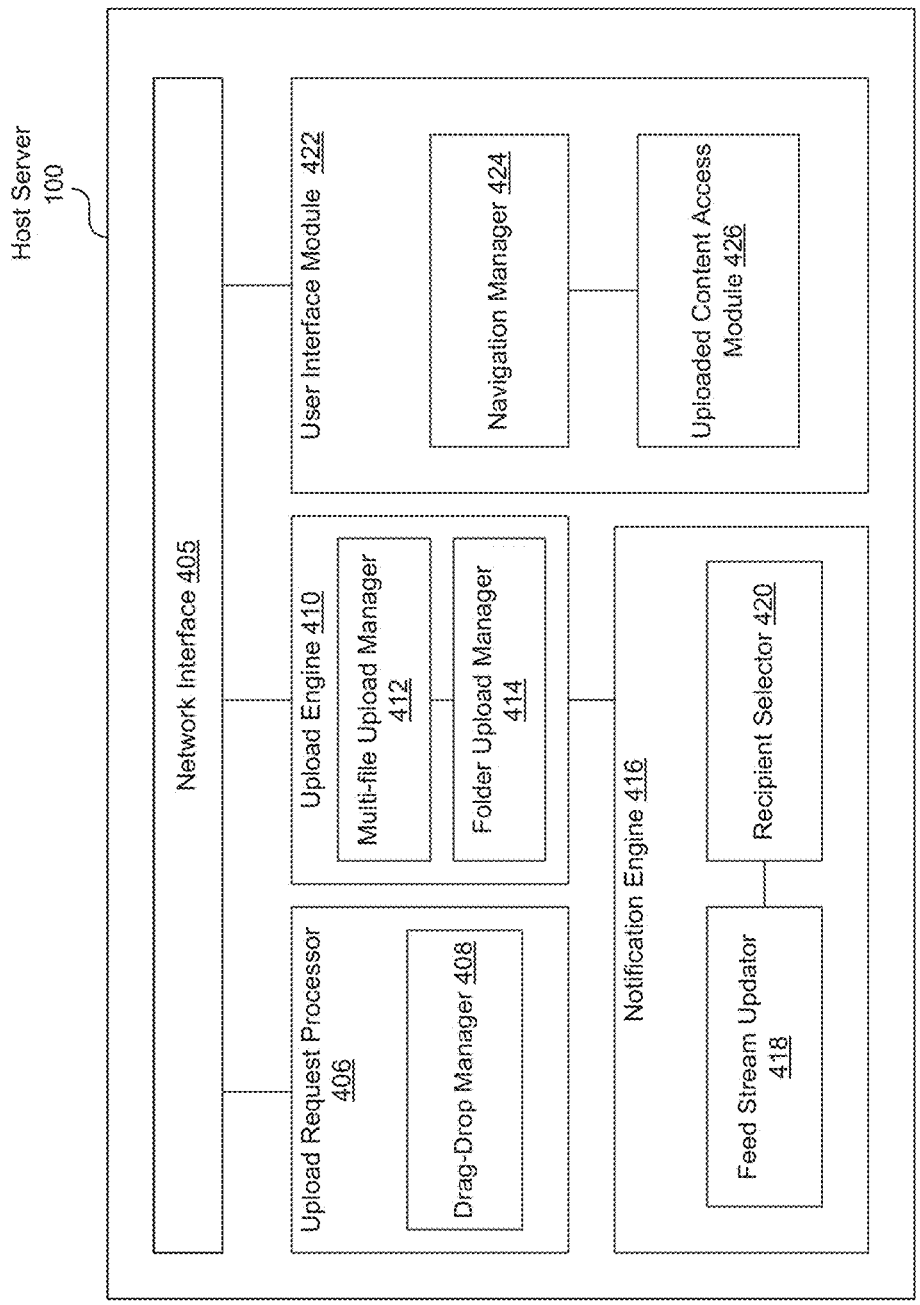
FIG. 4A illustrates a block diagram depicting example components of a host server 100 from FIG. 1.

FIG. 4A illustrates a block diagram depicting example components of a host server 100 from FIG. 1. In an embodiment, the host server 100 of the web-based or online collaboration environment can generally be a cloud-based service. In an alternate embodiment, the host server 100 can be any host server or content server from where data can be downloaded or to where data can be uploaded. The host server 100 can include, for example, a network interface 405, an upload request processor 406 having a drag-drop manager 408, an upload engine 410 having a multi-file upload manager 412 and a folder upload manager 414, a notification engine 416 having a feed stream updator 418 and a recipient selector 420 and a user interface module 422 having a navigation manager 424 and an uploaded content access module 426.

The network interface 405 can be a networking module that enables the host server 100 to mediate data in a network with an entity that is external to the host server 100, through any known and/or convenient communications protocol supported by the host and the external entity. The network interface 405 can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE), Bluetooth, a router, an access point, a wireless router, a switch, a multilayer switch, a protocol converter, a gateway, a bridge, a bridge router, a hub, a digital media receiver, and/or a repeater. The external entity can be any device capable of communicating with the host server 100, and can include client devices 102, sync server 120, notification server 150, and the like illustrated in FIG. 1.

An embodiment of the host server 100 includes the upload request processor 406 which can receive, detect, process, identify, parse, extract, translate, and/or determine an upload start request or notification and/or an actual upload from a client device. The upload request can be submitted by a user (e.g., through a user interface of a web-based or mobile application) to upload one or multiple items. The user can identify the files, content, or items to be uploaded to the host server 100 one-by-one and queue up multiple items (e.g., including but not limited to files, folders, documents, images, audio) to be uploaded in a single request. The user can also select all of the items to be uploaded in a single action (e.g., via highlighting or otherwise selecting of icons corresponding to each of the items). In one embodiment, the upload request is generated via a drag-and-drop action of the multiple work items to be uploaded to the host server into a portion of the user interface. Drag-and-drop activated uploaded requests can be detected, handled, received, processed, and/or otherwise managed by the drag-drop manager 408.

In an embodiment, the upload request is generated via a drag-and-drop action of a single folder which includes the multiple work items to be uploaded to the host server 100. For example, the upload request can be generated when a folder having the multiple items on a client device that is to be uploaded is identified through the user interface. In some instances, the folder can include additional folders in a folder hierarchy of multiple items. In some instances, the user can generate an upload request by activating the upload feature in a tab on the user interface and initiate uploading by selecting (e.g., clicking on or otherwise activating) the button/tab. Once selected, another user interface or a pop-up window may appear allowing the user to navigate through files or folders to select the items to be uploaded.

Once upload requests have been detected and processed, the upload engine 410 can upload the requested item or multiple requested items. The upload engine 410, in an embodiment, uploads a single item or multiple items (e.g., sequentially or simultaneously) to the host server 100 via the server-selected (or client-selected) upload pathway. A multiple item upload may be initiated via a single-step or multi-step user request. A multi-file upload request can be handled, processed, and executed, for example, through the multi-file upload manager 412.

In one embodiment, the multi-file upload manager 412 receives an identification of each of the multiple files to be uploaded (e.g., from the upload request processor 406) and sequentially prepares each individual file for uploading and uploads each file independently. For example, the multi-file upload manager 412 can compress one of the multiple files individually, upload it to the host server 100 and decompress the file when uploaded and proceed to perform the same steps with the next file. Preprocessing a file can include, for example, analyzing the file size and type to determine if it is acceptable/valid and/or to identify how best to compress the file. Post-processing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host server 100. The upload may automatically progress from one file when completed to the next one in sequence when the user initiates a multi-file upload request.

In one embodiment, the upload engine 410 uploads multiple items in a folder hierarchy based on a single request to upload a folder which has a hierarchy of folders inside, for example, via the folder upload manager 414. In one embodiment, the folder upload manager compresses the multiple items in the folder hierarchy in a single process into a single item and uploads the single item in a single upload process (rather than one by one) to the host server 100. After the merged file of multiple items has been uploaded, the folder upload manager 414 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allow the following overhead to be partially or wholly eliminated: repeatedly creating TCP connections for each upload, repeatedly checking the same permissions and storage quotas when processing the files on the server.

One embodiment of the host server 100 includes the user experience/user interface module 422, which preserves or enhances user experience before, during, or after an upload request. For example, the user experience/user interface module 422 (UE/UI module) can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 424 in the user experience/user interface module 422. In other words, while a file or item upload is in progress, the user can navigate to other pages to perform other actions or initiate additional actions on the current page without interrupting (stopping or pausing) the in-progress upload.

Similarly, when a multi-file or multi-item upload request is in progress, the user can also navigate away from the user interface which the upload request was submitted prior to completion of the uploading of each of the multiple items to the host server 100 via an accelerator node. Navigation between pages during an upload of multiple files can also be managed by the navigation manager 424. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 100 available for access through the user interface, even when some of the multiple items have not yet been uploaded to the host server, via the upload content access module 426, for example. Thus, during an active upload, individual files which have completed uploading can be accessed or interacted with by the user in the collaborative environment without having to wait for the full upload to complete.

In some instances, the item which has been uploaded to the host server is manipulable by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

In one embodiment, a progress bar indicating upload progress of the upload request is depicted in the user interface. The progress bar indicates the progress of the upload of the full request, typically. For example, if the request is a multi-file upload request, the progress bar indicates the progress of uploading all of the files. In addition, the progress bar can further indicate the total size of upload, time elapse, completed upload file size, time remaining, average speed of upload, and/or total files that have completed upload. Upload progress can be determined since at any moment the uploader knows the total bytes that have been transferred, the time elapsed, and total size of the upload. In one embodiment, the time elapsed can be determined to count only the time that files are being transferred, and not the time files are being processed. In one embodiment, the progress bar is depicted even when the user navigates away from the user interface to another user interface during the upload process.

One embodiment of the host server 100 includes a notification engine 416. The notification engine 416, can for example, update a feed stream to include an updated feed indicating that an item or multiple items have been uploaded, for example, via the feed stream updator 418. The users that are notified can be selected, for example, by the recipient selector 420, and can include collaborators or the user, or other users meeting a criterion. In some instances, the feed stream is updated in real time or near real time relative to when the upload of the item completed. For real-time updating, the notification engine 416 can utilize another server, or another engine in the same server which provides push functionality.

The notification engine 416 can generally inform or notify users, which can be collaborators of the user who performed the activity in the work space via one or more of many mechanisms, including but not limited to, email, SMS, voice-message, text-based message, RSS, feed, and the like.

In one embodiment, the notification is depicted through a web-browser used by the other user to access the web-based collaboration environment, for access in real time or near real time to when the activity was performed by the user. When notifying a user in real time through a web-browser, the notification engine 416 can utilize a push-enabled service to ensure real time notification. In one embodiment, the notification is sent by a component or another server which implements push technology. The push-enabled service can be implemented via long poll or HTTP streaming, for example, by a device which may be internal to or external to the host server 100. In addition, the host server 100 could utilize other push servers including third party push servers to implement push technology including but not limited to mobile platform push systems and services (e.g., via smart phones or tablets or other portable devices such as iPhone, Android phones, Blackberry, iPad, Galaxy or other tablets)

3. Sync Architecture

Figure 4B:
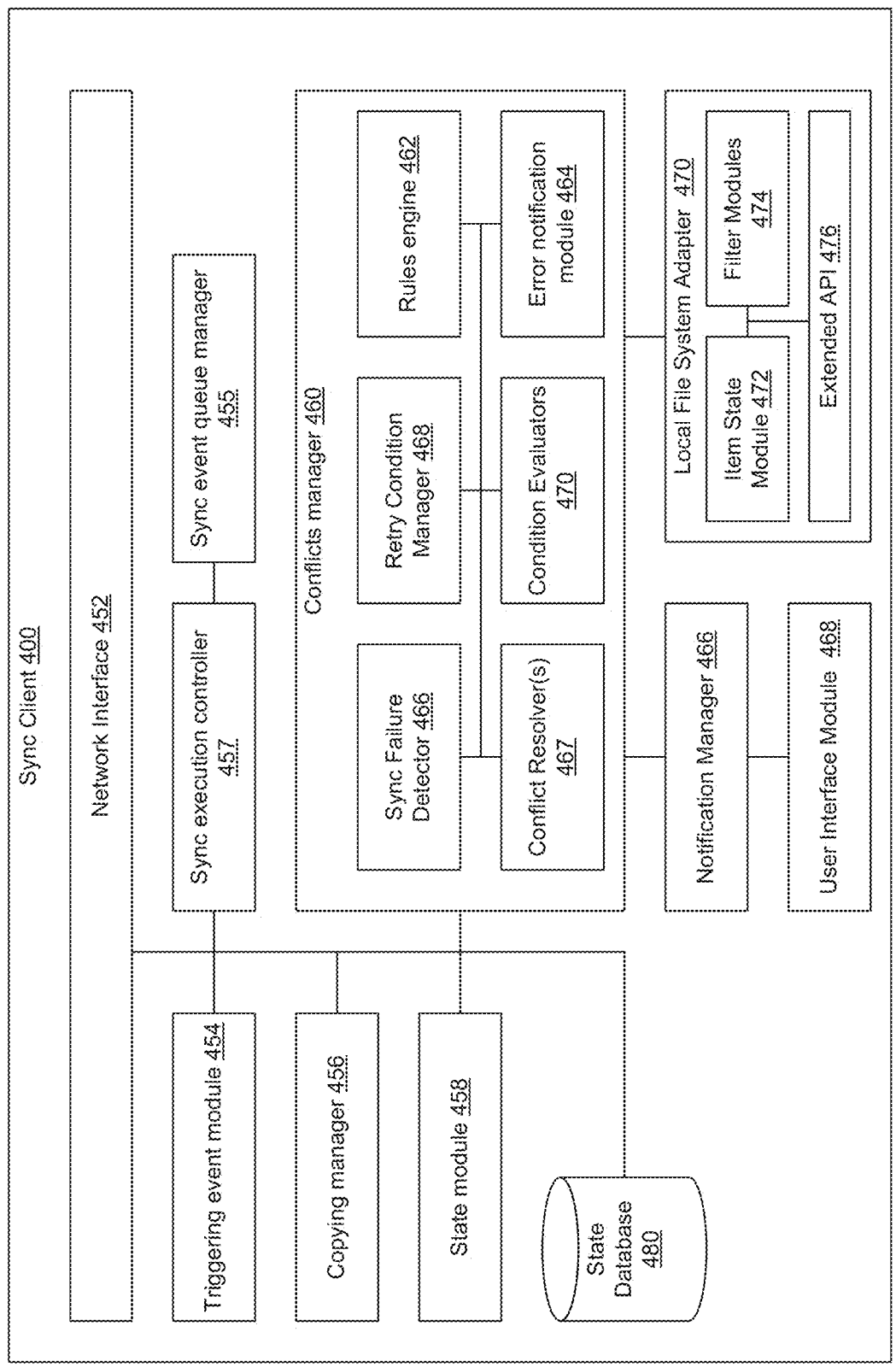
FIG. 4B illustrates a block diagram depicting an example of components in a sync client running on a local user device that synchronizes copies of items stored on the local device with copies of items stored in a cloud server file system (e.g., file system of a web-based or cloud-based collaboration environment).

In one embodiment, the sync architecture includes server-side sync component (e.g., residing in the cloud-based server 100 or sync server 120) and a client-side sync client residing on a local user device. FIG. 4B depicts a block diagram illustrating an example of components in a sync client 400 running on a local user device (e.g., user device 102 in FIG. 1) that synchronizes copies of items stored on the local device with copies of items stored in a cloud server file system (e.g., file system of a web-based or cloud-based collaboration environment).

The sync client 400 can include, for example, a conflicts manager 460, a triggering event module 454, a copying manager 456, a state module 458, a state database 480, a sync execution controller 457, a sync event queue manager 455, notification manager 466, a user interface module 468 and/or a local file system adapter 470. The conflicts manager 460 can include a rules engine 462 and/or an error notification module 464 (the function of this module may be combined with the notification manager 466), a sync failure detector 466, one or more conflict resolvers 467, a retry condition manager 468 and/or a condition evaluation engine 470. The local file system adapter 470 can include an item state module 472, filter modules 474 and/or an extended API 476. Additional or fewer components/modules/engines can be included in the sync client 400 and each illustrated component.

One embodiment of the sync client 400 includes the triggering event module 454 which determines when synchronization of files/folders should occur. A triggering event can occur when a change has been made to the cloud server file system. As a result of this event, a notification is sent from the notification server 150 to the triggering event module 454. In some instances, when a user has an application open and edits a file in the cloud server file system (e.g., edits a file in a server sync folder), editing of the file causes the notification server 150 to send a notification to the triggering event module 454, causing the change to be downloaded to the local sync folders of other collaborators as part of the synchronization function. In some instances, the notification is sent to the triggering event module 454 after the user has saved the file and closed the application.

The notification server 150 can provide real time or near real-time notifications of activities that occur in a particular server sync folder. In one embodiment, the triggering event module 454 can subscribe to a real-time notification channel provided by the notification server 150 for a particular server sync folder to receive the notifications.

In one embodiment, the notifications provided by the notification server 150 inform the triggering event module 454 that a change has occurred in the server sync folder. In this case, the state module 458 requests from the current state manager 482 in the sync server 120 (in FIG. 4C) the current state of the folder/file tree for the server sync folder that the local sync folder is synchronized to.

The state module 458 also accesses the last known state of the folder/file tree stored in the state database 480 and compares the current state with the last known state to determine which file and/or folder has changed. Once the changed files and/or folders have been identified, the copying manager 456 downloads the changed file(s) from the server sync folder to the local sync folder.

A triggering event can also occur when a change has been made to a local sync folder on a collaborator's computer. In one embodiment, a Windows operating system of the collaborator's computer provides file/folder monitoring on the computer and notifies the triggering event module 454. Other operating systems or programs running on collaborators' computer systems can provide a similar type of notification to the triggering event module 454. Once the triggering event module 454 has been notified of the change to the local sync folder, a notification is sent to the sync server 120.

When this type of triggering event occurs, the copying manager 456 uploads the changed file to replace the copy of the file stored in the server sync folder. Once the file has been uploaded to the server sync folder, the local copy of the file stored on the computers of other collaborators of the workspace who have enabled the synchronization function are updated in a similar manner as described above for the first type of triggering event.

One embodiment of the sync client 400 includes a sync event queue manager 455 that places sync events on a sync event queue for serialized execution. The sync execution controller 457 gets the next event to execute from the sync event queue. The execution controller 457 can have a list based or priority based implementation. For example, in the list based implementation, the next event candidate is checked against the items that are in progress and if the item already has an in progress sync event, the next event candidate is skipped. In the priority based implementation, unprocessed events are managed in a priority queue of sync event containers. A sync event container is a set of all unprocessed sync events for a given item, weighted by the lowest weight sync event in the container. When one sync event from this sync event container is executed, then all sync events for that item are no longer in the priority queue and so the remaining sync events in the sync event container will not be executed on subsequent get_next_sync_event( ) calls. When the in-process sync event is completed, it is removed from the sync event container which is returned back into the priority queue if not empty.

One embodiment of the sync client 400 includes a conflict manager 460. The conflict manager, via the sync failure detector 462, can identify when a sync has failed or when a conflict has occurred (e.g., a file or work item/folder has been changed at both the server sync folder and the local sync folder) which caused the sync to fail. A sync can fail for various reasons which may be conflict related or unrelated. Example failure reasons that are related to conflict include, but are not limited to: item not found, item name in use, item name not valid, item name too long, item locked, version mismatch, or the like. Other failure reasons can include, for example, communication failure (e.g., network goes down), authentication failure (e.g., auth token expired), quota failure, or the like. Some of these sync failures are local to a particular sync event (e.g., item not found is local to a sync event relating to the item) while others are global (e.g., communication failure can impact all sync events).

The conflict manager 460 also includes one or more components to determine how to resolve the conflict, resolve the conflict using the determined strategy and try to sync again when one or more retry conditions are met. The conflict manager 460 can include several conflict resolvers to resolve various conflict cases. The conflict manager 460 selects a conflict resolver that is mapped to the event type, file system and failure reason triple to resolve a conflict related to a sync event. The conflict resolver 467 that is selected resolves the conflict by calling the rules engine 462 to determine what action to take to resolve the conflict. When the specified action or actions is taken, the file system is restored back to its consistent state.

The rules engine 462 stores rules for resolving conflicts. Rules are pre-defined but can be changed without changing the software implementing the rules engine. The rules engine 462 takes as input the types of changes that have occurred at the various synchronized folders, for example, edits to a work item, renaming of a work item, or moving of a work item to a different location or the like, file system (e.g., local or remote), or the like. Then the rules engine 462 provides the action to be performed for the particular conflict.

There are two types of conflicts, a soft conflict and a hard conflict. A hard conflict occurs when the same operation occurs on both copies of the file, and a soft conflict occurs when a different operation occurs on each of the two copies of the file. In one embodiment of the sync client 400, in the case of a hard conflict, for example, when copies of a work item have been changed at the server sync folder and at a local sync folder, the conflicts manager 460 is not able to merge the changed files. In one embodiment, the conflicts manager 460 makes a copy of the changed work item in the local sync folder and renames the copy with the original file name and an identifier of the collaborator associated with the local sync folder. Next, the conflicts manager 460 downloads the changed work item from the server sync workspace to the local sync folder, and then uploads the copy of the work item with the modified file name to the server sync folder. Thus, two versions of the file are stored at the server sync folder and the local sync folder. Then, the error notification module 464 sends a message to the user to notify him that the changes in his version of the work item were not accepted but was uploaded to the server sync folder as a new version of the file with a new file name and requests the user to merge the two files manually.

In one embodiment, in the case of a soft conflict, for example, when a file is moved on the server and edited locally, the conflict manager 460 can merge these two changes so that the file is moved locally to the new location and the local edits are uploaded to the server copy of the file.

The conflict manager 462 also includes a retry condition manager 468 and a condition evaluation engine 470. Once the conflict resolver resolves the conflict and the file system is in a consistent state, the sync event that failed can be retried. In one embodiment, the sync execution controller 457 updates the sync event for retry based on condition details specified by the conflict resolver. The retry condition manager 468 monitors for retry events and invokes one or more condition evaluators to evaluate the conditions for the retry events. When the retry conditions are satisfied (as detected by the condition evaluators 470 that subscribe to various state change notifications), the retry condition manager 468 re-executes the sync event. In one embodiment, re-executing of the sync event includes changing the state of the sync event to "unprocessed" so that the sync event can be placed in a sync event queue for execution.

The local file system adapter 470, in one embodiment, includes components that allow items to be flagged as "ignorable," exclude from synchronization the "ignored" items so that ignored local files are prevented from moving to the cloud server. The local file system adapter 470 can also handle transitions between "ignorable" ←→ "syncable" for a given item, effectively either creating or deleting the file in question and/or provide the information necessary to support the sync user experience/user interface. This is achieved through "ignored item" notifications sent to all registered components (e.g., via notification manager 466). The extended API 476 returns file attribute information such as hidden, system or alias attributes and may be specific to the operating system platform. The filter modules 474 can include one or more filters (e.g., the filters described in detail in section 6 of this application) that retrieve attribute information and place the information in the raw event, use the attribute information and/or naming convention rules to change an item state's syncability property to "ignorable," compare old and new states, and/or the like. The item state module 472 can keep track of the state of the item such as "syncable," "ignorable" or "problematic."

Figure 4C:
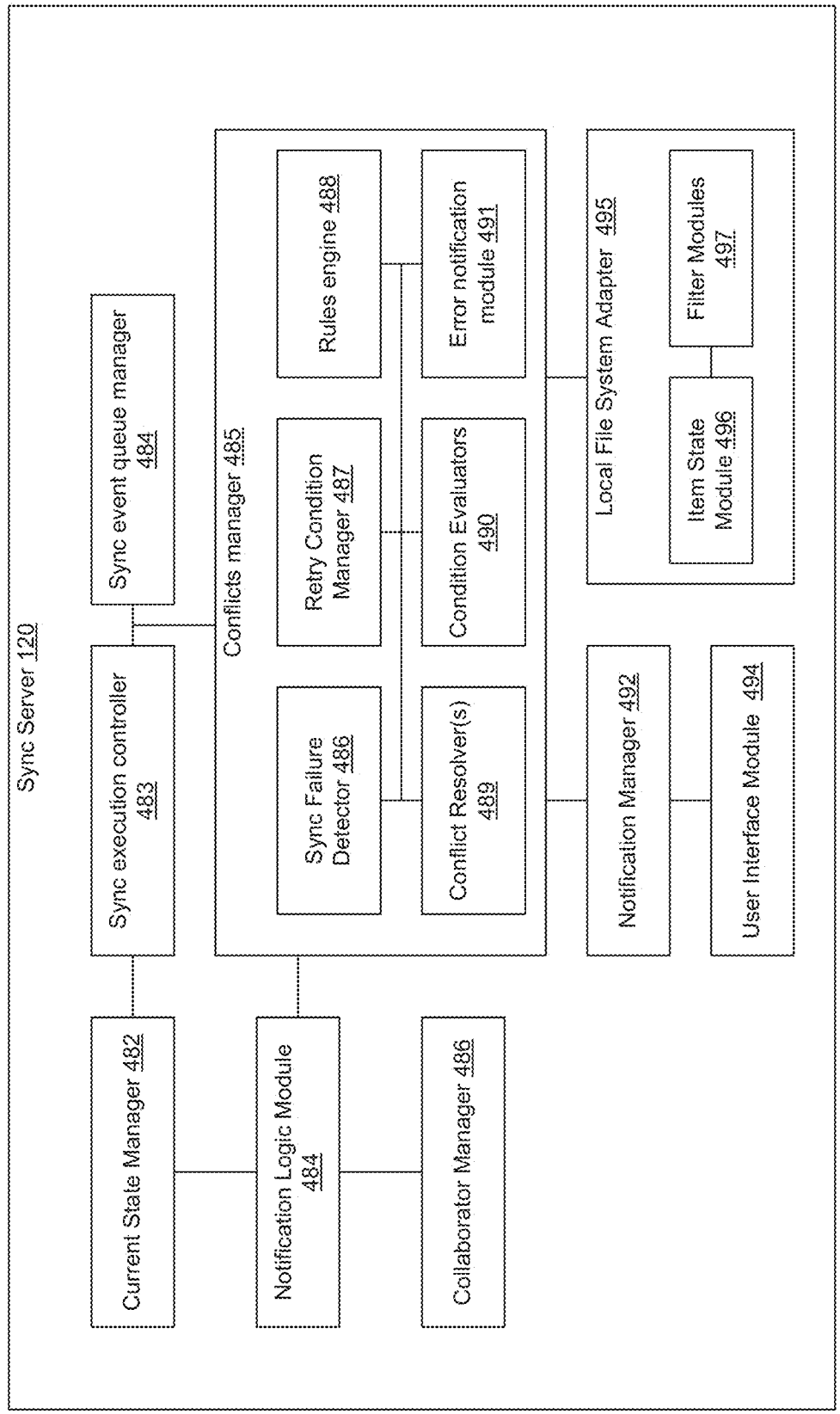
FIG. 4C illustrates a block diagram depicting example components of a sync server that synchronize copies of items stored on the local device with copies of items stored in a cloud server file system (e.g., file system of a web-based or cloud-based collaboration environment).

Referring to FIG. 4C, the sync server 120 in one embodiment, includes many of the same components for conflict resolution as the sync client 400. For example, the sync server 120 can include a sync execution controller 483, a sync event queue manager 484, a conflicts manager 485 having a sync failure detector 486, conflict resolvers 489, retry condition manager 487, condition evaluators 490, rules engine 488, error notification module 491, notification manager 492, user interface module 494 and/or a local file system adapter 495 having an item state module 496 and filter modules 497. More or less components can be included in the sync server for conflict management in some embodiments.

Figure 4D:
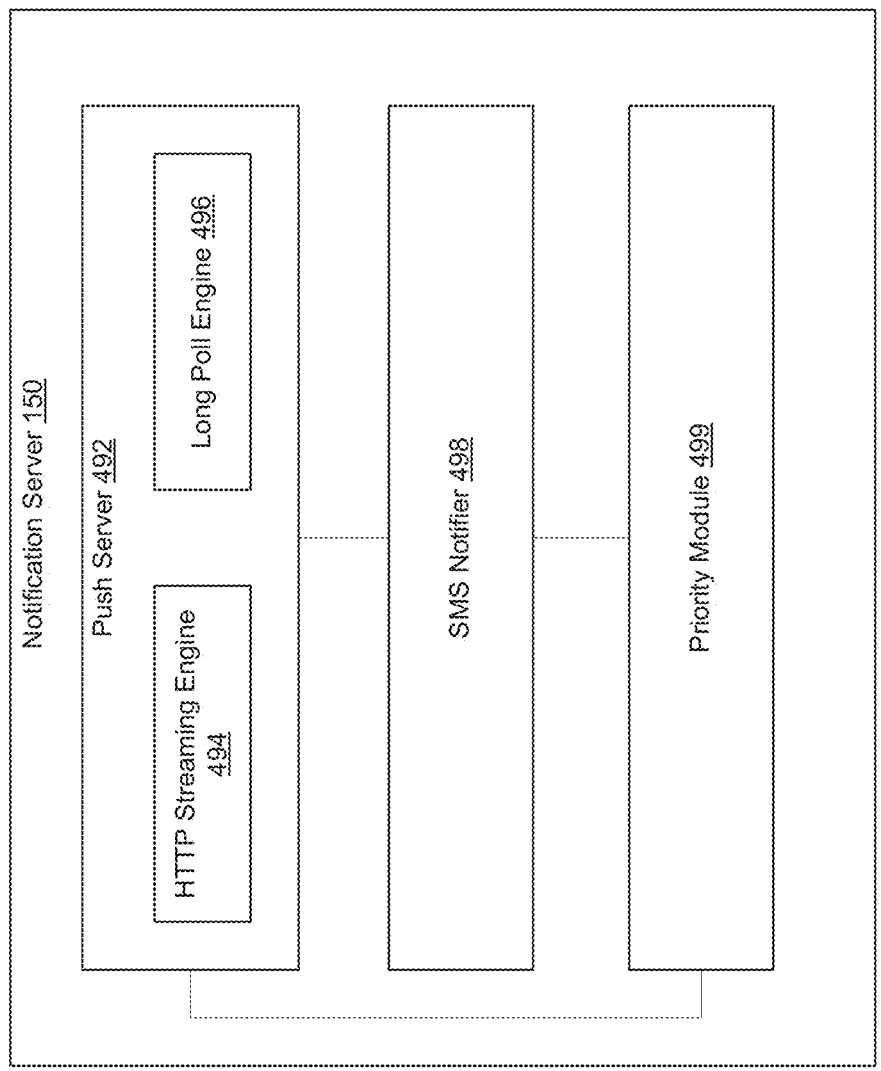
FIG. 4D illustrates a block diagram depicting example components of a notification server.

FIG. 4D illustrates a block diagram depicting an example of components in a notification server 150 for providing real time or near real time notifications of activities that occur in a web-based or online collaboration environment.

The notification server 150 generally includes, for example, a push server 492, an SMS notifier 498, and/or a priority module 499. In one embodiment, the push server 492 includes a long poll engine 496 and/or an HTTP streaming engine 494. Additional or less components/modules/engines can be included in the notification server 150 and each illustrated component.

The notification server 150 can support the services of a collaboration platform or environment to provide real time or near real time notifications of activities. In one embodiment, the notification server 150 is integrated within a host server of a collaboration platform (e.g., the host server 100 shown in the example of FIG. 1 and FIG. 4A, for example). The notification server 150 may also be externally coupled to the host server (e.g., the host server 100). In some instances, a portion of the functions implemented and performed by the notification server 150 can be implemented in part or in whole in the host server 100. For example, some of the components shown to be in the notification server 150 and associated functionalities can in part or in whole reside in the host server 100.

In one embodiment, the notification server 150 sends a notification of an activity that occurs within a collaboration platform to a recipient. The notification is sent by the server 150 such that the recipient is notified in real time or near real time to when the activity occurred or when the activity was performed. Real time notification can be performed via push technology, for example by the push server 492 through long polls (e.g., via the long poll engine 496) and/or through the HTTP streaming (e.g., via the HTTP streaming engine 494). The notification server 150 can communicate with the host server to determine a recipient to whom to notify. The notification server 150 can also determine the activity to notify the recipient of, for example through communication with the host server.

In one embodiment, the notification is presented in a feed stream among other notifications through a user interface on the user device according to relevancy to the user determined based on current or recent activity of the user in the web-based collaboration environment. The presentation priority in a user interface in a feed stream can be managed, in whole, or in part, for example, by the priority module 499 using information determined by a notification prioritizer.

In one embodiment, the notification server 150 can send notifications to users via SMS (e.g., through the SMS notifier 498). In this instance, the notification server 150 can be coupled to an SMS center which forwards the SMS text message to a mobile device over a cellular network. The notification can be sent via SMS in real time or near real time, or with a delay.

4. Sync Execution, Conflict Resolution and Retry Conditions

Various local and cloud server (e.g., Box server) conflicts and conflict resolver actions illustrated in FIGS. 5A-5J will now be described. It should be noted that the file system changes occur in parallel and the event arrival times are non-deterministic. Additionally, the sync events are executed in a serialized manner.

Figure 5A:
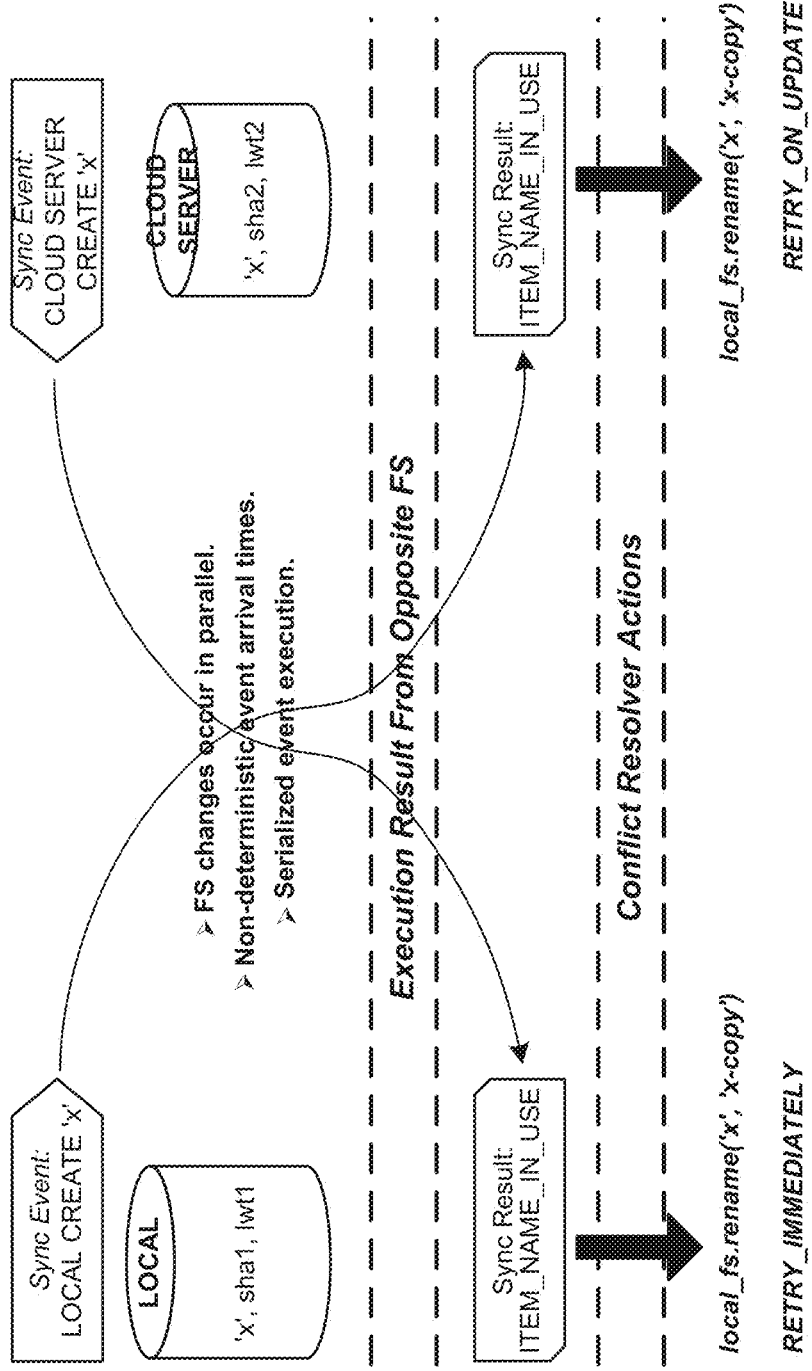
FIGS. 5A-J illustrate local and cloud server conflicts and conflict resolver actions.

FIG. 5A depicts a use case where create events for different files occur both on local and the cloud server. It is possible that a create event could be dropped or not received at all because it might be on an unsynchronizable file (such as a hidden or too large file). This is the reason why the conflict resolver on each side (i.e., client side and server side) attempts to a rename the files to correct the conflict. As shown, on the client side, the file name is renamed to "x-copy" and the sync event status is updated to retry immediately. The retry condition manager 468 monitoring for retry events would detect this change and would perform the retry. Similarly, on the server side, the same change is made and the event is associated with the retry on update condition. If the conflict resolver fails because the file name 'x' no longer exists, then it will do the appropriate retry any way.

Figure 5B:
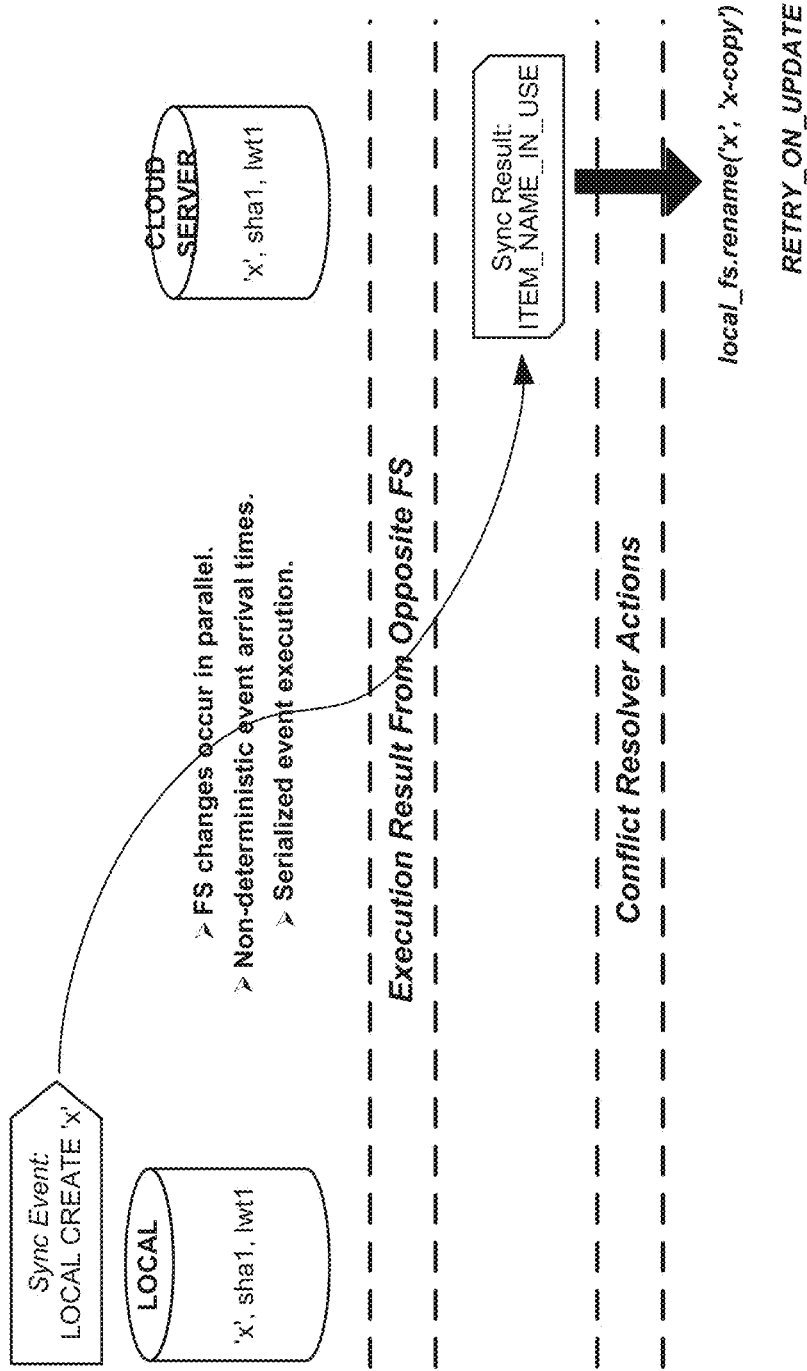

FIG. 5B depicts a use case where a local create conflict occurs. The sync result indicates that the sync failed because the item name is already in use in the cloud server file system, the conflict resolver on the server side resolves the conflict by renaming the item and associating the RETRY_ON_UPDATE condition.

Figure 5C:
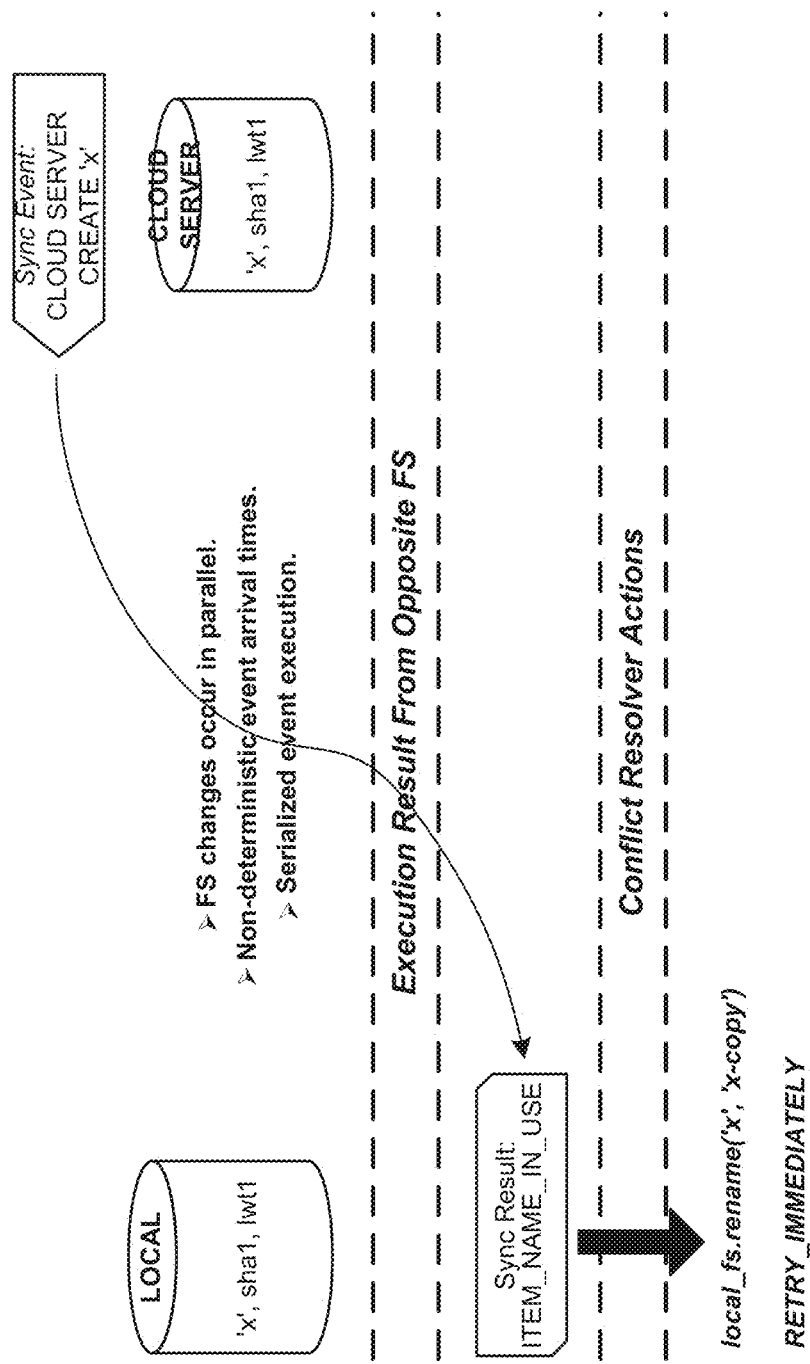

FIG. 5C depicts a use case where a cloud server create conflict occurs. The sync result indicates that the sync failed because the item name is in use. The conflict resolver on the local sync client then renames the item to resolve the conflict and attaches the condition "RETRY_IMMEDIATELY" to the sync event. It should be noted that the local rename is not based on local ID but on file name since no local ID may be available at that time of conflict resolution.

Figure 5D:
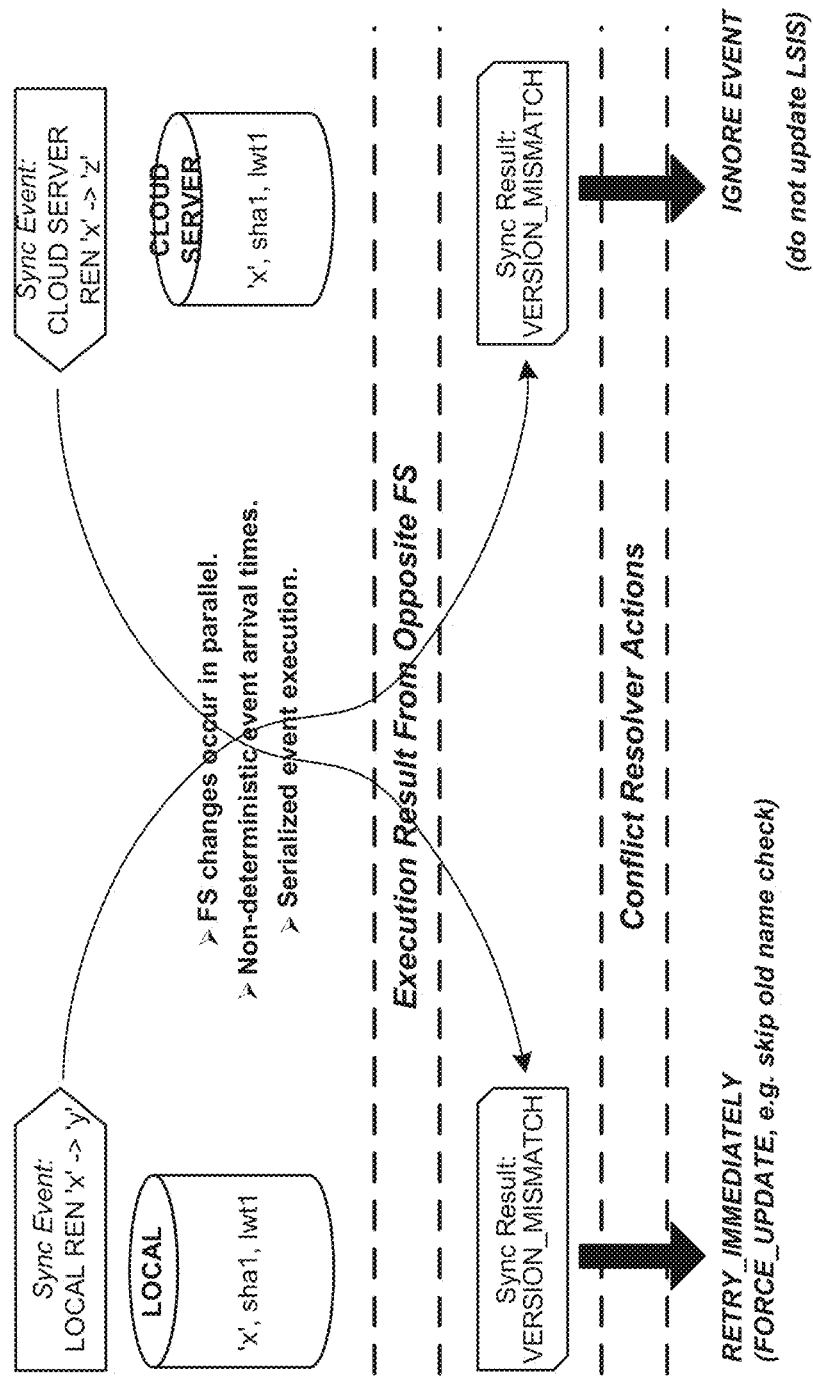

FIG. 5D depicts a use case where a local rename and cloud server rename conflict occurs. The sync results on both sides indicate version mismatch as the failure reason. As shown, in this case, the local conflict resolver then updates the sync event to retry immediately or force update (e.g., skip old name check), while the cloud server conflict resolver ignores the event (i.e., treats as success).

Figure 5E:
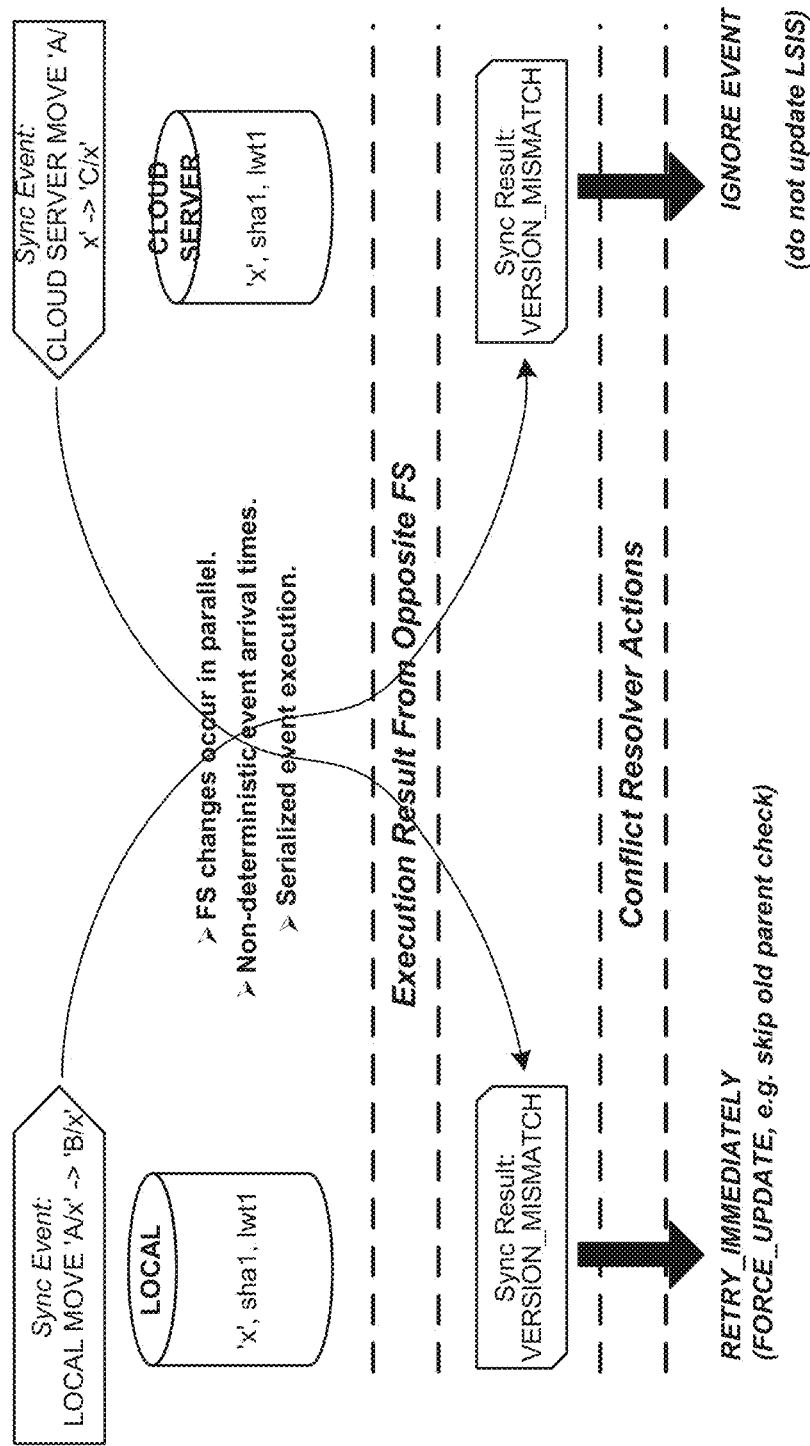

FIG. 5E depicts a use case where move events for the same file occur both on the local and cloud server file systems. When the sync events are executed, the sync result indicates a version mismatch as the failure reason. For the "move," "local file system" and "version mismatch" triple, the local conflict resolver updates the sync event to retry immediately or force update. On the server side, the conflict resolver ignores the event (i.e., treat as success).

Figure 5F:
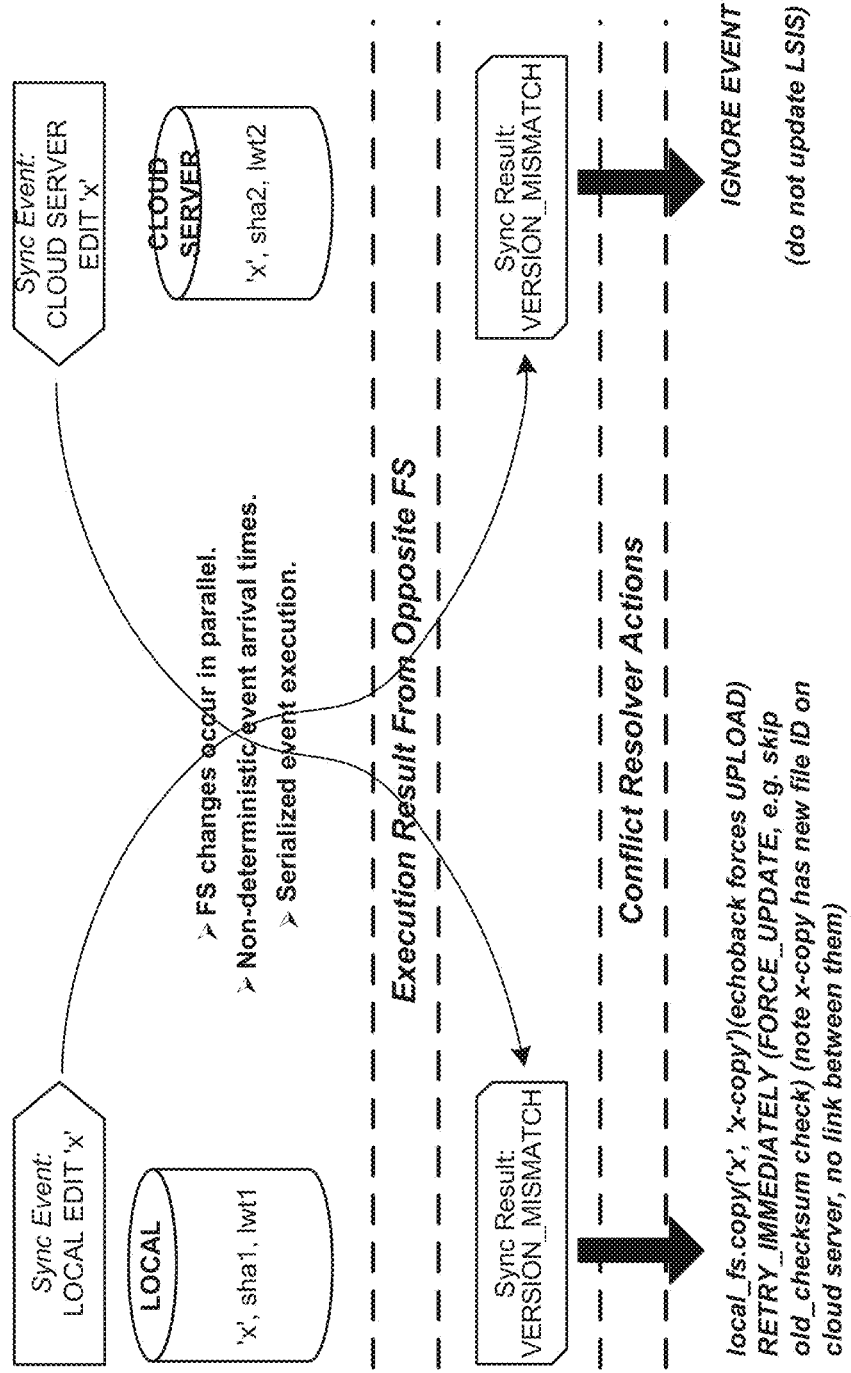

FIG. 5F depicts a use case where a local move event conflicts with a cloud server move event. This may be applicable to files or both files and folders. When the sync events are executed, the sync result indicates a version mismatch as the failure reason. For the "edit," "local file system" and "version mismatch" triple, the local conflict resolver renames the file or folder and updates the sync event to retry immediately or force update. The renamed file has a new file ID on the cloud server. On the server side, the conflict resolver ignores the event (i.e., treat as success).

Figure 5G:
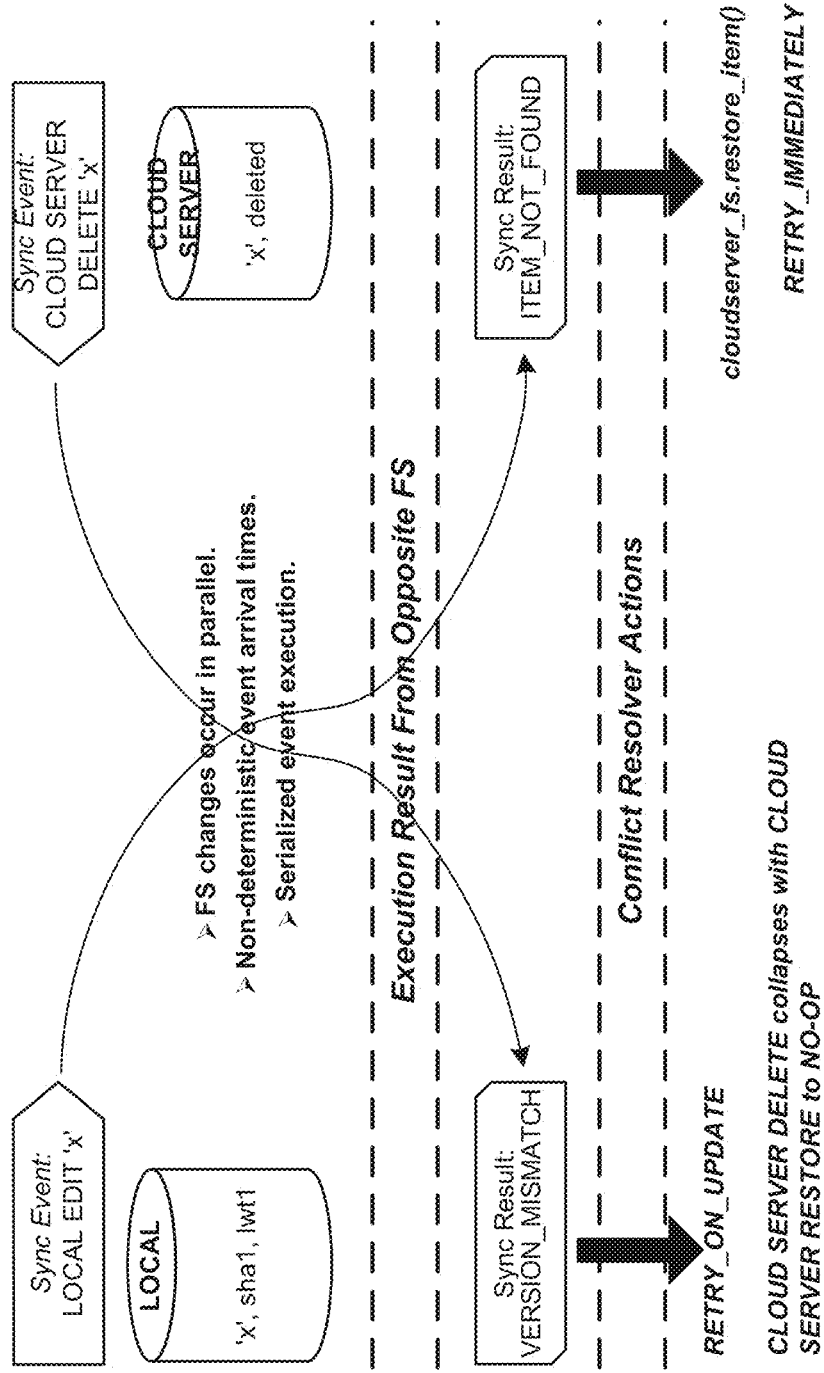

FIG. 5G depicts a use case where a local edit event on a file conflicts with a cloud server delete event on the same file. When the sync events are executed, the sync result on the client side indicates a version mismatch as the failure reason, while the sync result on the server side indicates item not found as the failure reason. The local conflict resolver updates the sync event to retry on update. On the server side, the conflict resolver restores the deleted file back to the cloud server file system and updates the sync event to retry immediately.

Figure 5H:
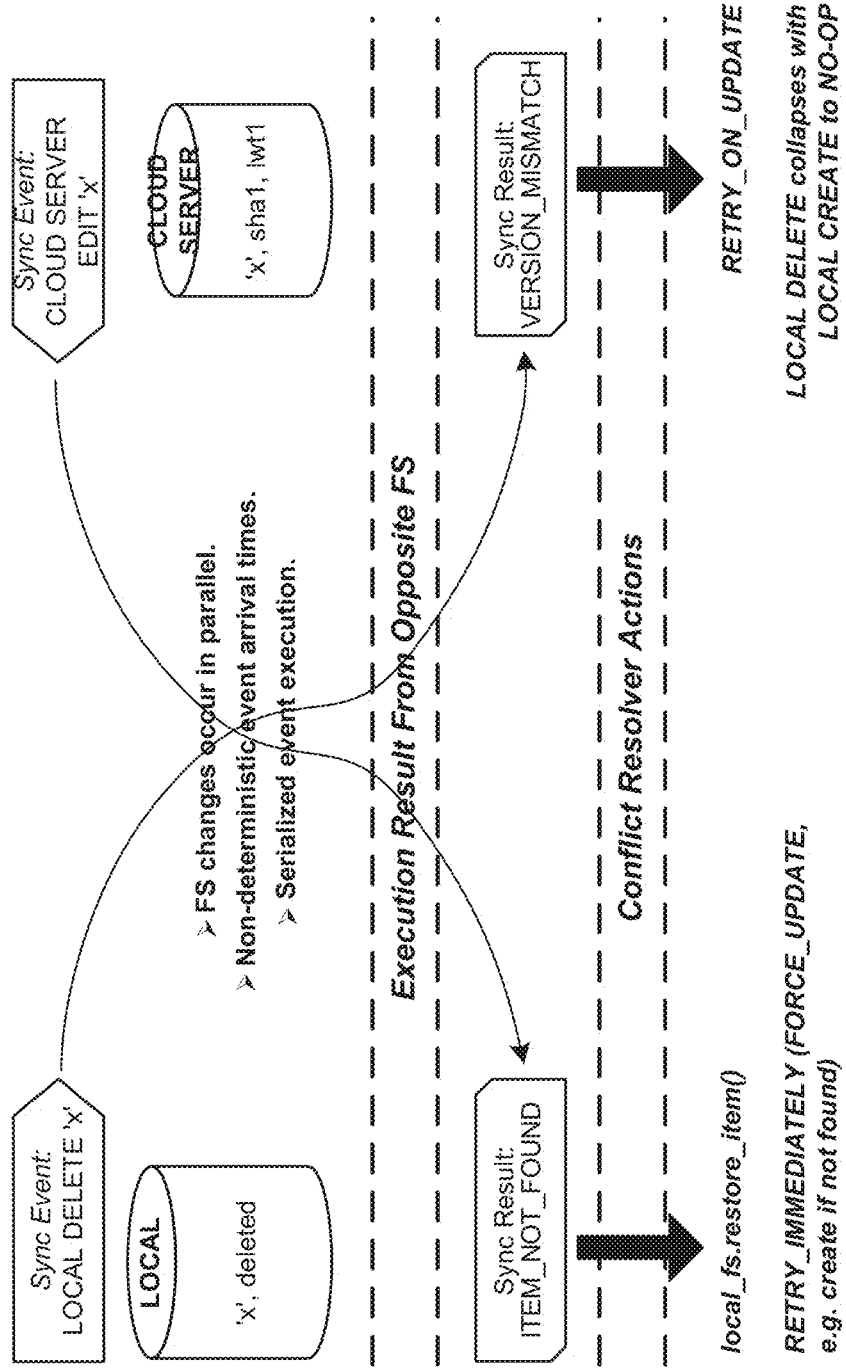

FIG. 5H depicts a use case where a local delete event on a file conflicts with a cloud server edit event on the same file. When the sync events are executed, the sync result on the client side indicates item not found as the failure reason, while the sync result on the server side indicates version mismatch as the failure reason. The local conflict resolver restored the deleted file to the local file system and updates the sync event to retry immediately or force update. On the server side, the conflict resolver updates the sync event to retry on update.

Figure 5I:
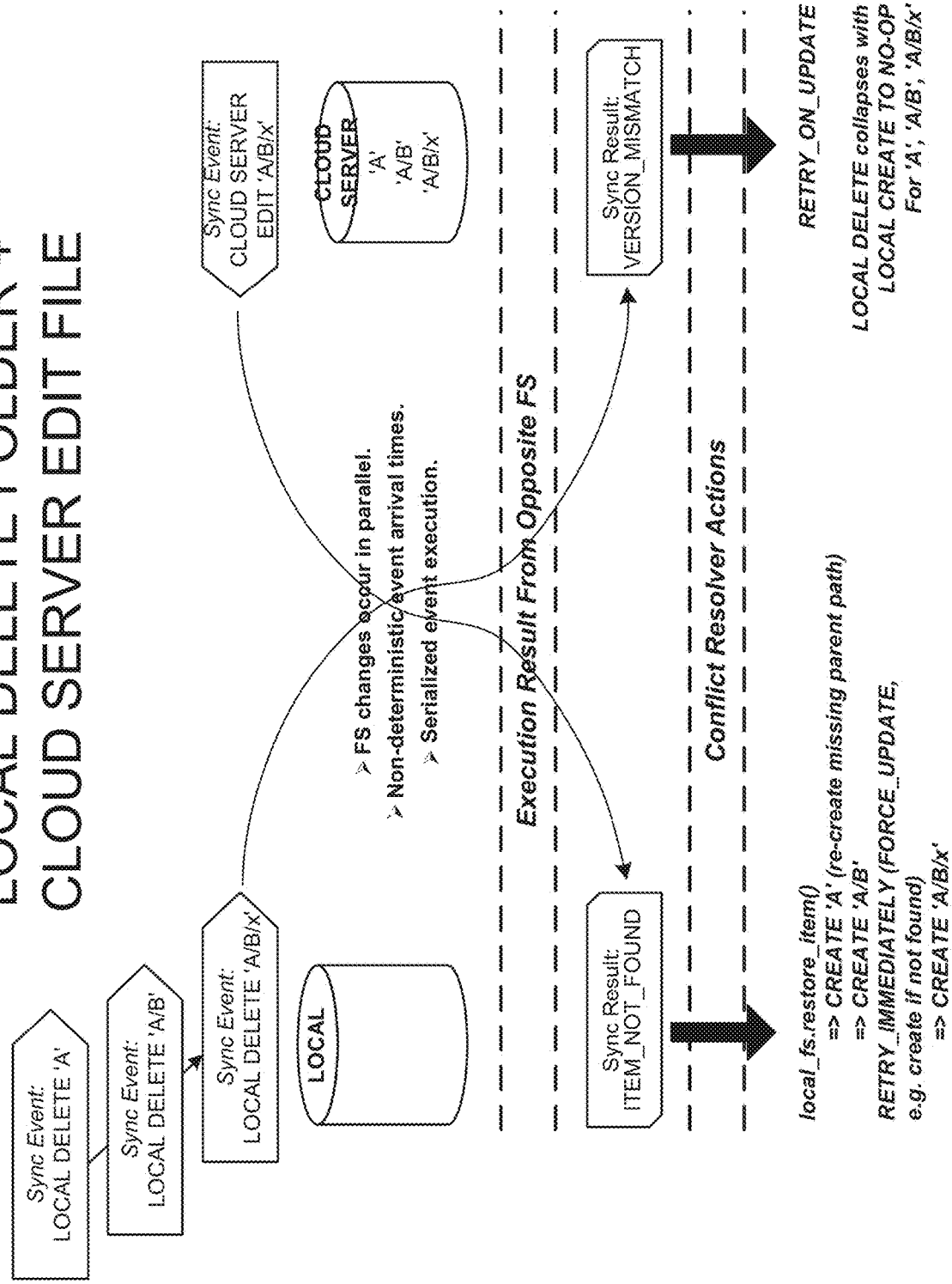

FIG. 5I depicts a use case where a local delete folder event conflicts with a cloud server file edit event. Here, the local folder delete event comprises three sync events local delete "A," local delete "A/B" and local delete "A/B/x." When the sync events are executed, the sync result on the client side is item not found while the sync result on the server side is version mismatch. The conflict resolver on the client side resolves this conflict by restoring the folder to the local file system. The conflict resolver does this by restoring the file and the path and updates the sync event to retry immediately. The conflict resolver on the server side updates the sync event to retry on update.

Figure 5J:
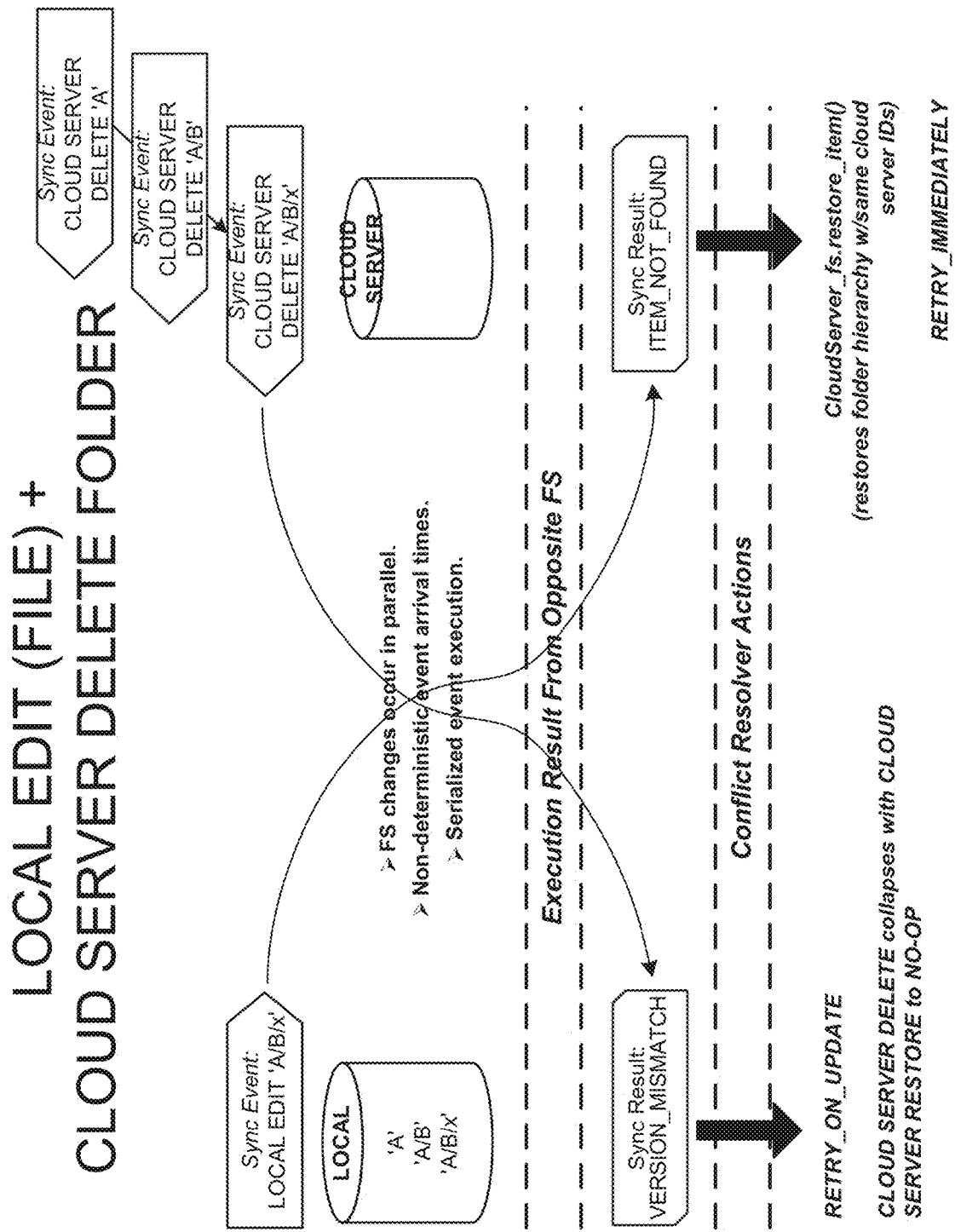

FIG. 5J depicts a use case where a local edit file event conflicts with a cloud server delete folder event. In response to the sync failure due to version mismatch, the conflict resolver on the client side updates the event to retry on update. The conflict resolver on the server side responds to the item not found sync result by restoring the deleted item and folder hierarchy with same cloud server IDs and updates the sync event to retry immediately.

The breakdown of work in serialized execution of sync events and updating of sync events to retry using condition details described in the context of FIGS. 5A-5J is provided below.

1. The sync execution controller and the sync queue manager facilitate the serialized execution of sync events for a specific item in a file system sync event queue a. In one embodiment, the serialization is a simple list based implementation. Inside get_next_synchronization_event( ), the sync execution controller checks the next event candidate against the items in the in_progress_list and skips if already an in-progress sync event on item.

b. In other embodiment, the serialization is priority queue based implementation in which, UNPROCESSED events are managed in a priority queue of 'synchronization_event_containers'. A synchronization_event_container is the set of all UNPROCESSED synchronization events for a given item, weighted by the lowest weight synchronization event in the container. When one synchronization event from this synchronization_event_container is executed then all synchronization events for that item are no longer in the priority queue so won't be executed on subsequent get_next_synchronization_event( ) calls. When the in-process synchronization event is completed, it is removed from the 'synchronization_event_container' which is returned back into the priority queue if non-empty. For example:

---

1. priority_queue.remove_min( ) returns synchronization_event_container
   a. { 'REN x->y' (UNPROCESSED),
   b. 'EDIT y' (UNPROCESESD) }
2. in_process_synchronization_event_containers.add(
   a. { 'REN x->y' (INPROCESS),
   b. 'EDIT y' (UNPROCESESD) }
3. Subsequent priority_queue.remove_min( ) will now return the in-process synchronization_event_container, and therefore the 'EDIT y' (UNPROCESSED) event will not be executed.
4. Update_synchronization_event('REN x->y', SUCCESS) will update the synchronization_event_container:
   a. synchronization_event_container.remove('REN x->y')
   b. synchronization_event_container now:
      i. { 'EDIT y' (UNPROCESSED) }
   c. priority_queue.enqueue(synchronization_event_container)
5. Subsequenet priority_queue.remove_min( ) will now return the synchronization_event_container with EDIT event for processing.
6. RETRY_IMMEDIATELY with FORCE_UPDATE
   ⇒ If flagged, then ignore the old_ validation check.
   ⇒ If file edit and destination file does not exist, then create a new file.
7. IGNORE EVENT.
   ⇒ Treat as 'SUCCESS'
   ⇒ Do *NOT* update Last Synchronization Item Store
8. LOCAL COPY FILE
   ⇒ Make copy of the file to another name.
9. CLOUD SERVER RESTORE ITEM
   ⇒ Restore a file and relevant parent folder path.
10. LOCAL RESTORE ITEM
    ⇒ Restore a file and relevant parent folder path.
11. Configure conflict resolution policy to use above.

---

Figure 6:
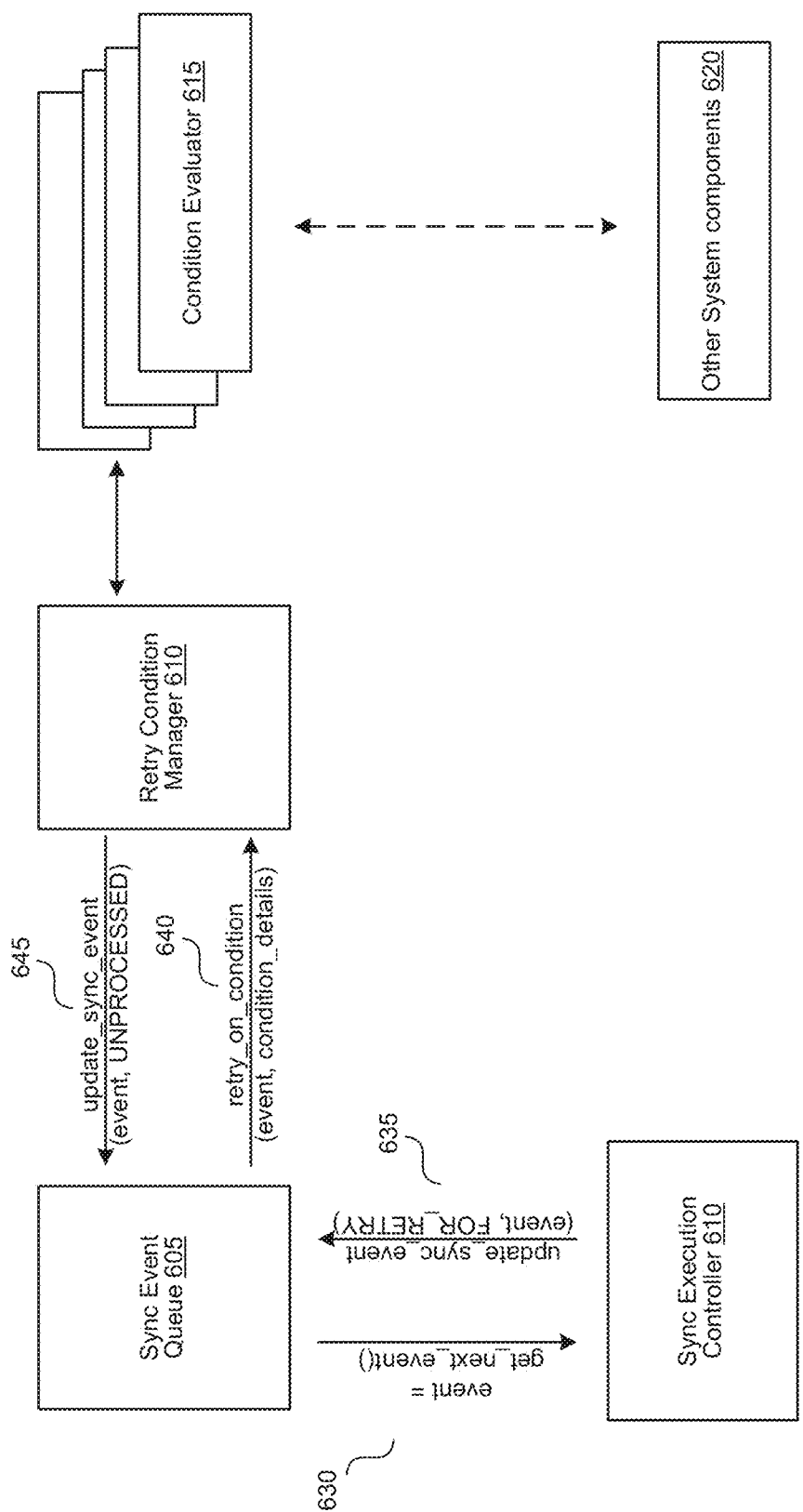
FIG. 6 illustrates a block diagram depicting an example flow between sync components in executing sync events and updating sync events for retry.

FIG. 6 is a block diagram illustrating an example flow between sync components in executing sync events and updating sync events for retry. As illustrated, the sync execution controller 610 (e.g., sync execution controller 457 in FIG. 4B) gets the next event to execute from the sync event queue managed by the sync event queue manager 455 using the get_next_event( ) call. As previously described, the next event can be list based or priority based. The sync execution controller 610 updates the event for RETRY based on a condition details. For example, if the sync result is a failure, the conflict resolver 467 determines the action to be taken to resolve the condition and a retry condition. The retry condition manager 610 (e.g., retry condition manager 468 in FIG. 4B) monitors for RETRY events. The retry condition manager then updates the event status to UNPROCESSED when the condition is satisfied, as determined by the condition evaluator 615 (e.g., one or more condition evaluators in the condition evaluation engine 470).

The retry condition manager 610 can encapsulate the following functions to monitor changes in event state into RETRY state and update the sync event to UNPROCESSED when the condition for retry is satisfied:

---

```
def __init__(sync_event_queue_subscribe_event_changes,
    fs_adapter_status_apis):
        # Initialize ConditionEvaluators
        # Subscribe for event state changes (into RETRY state)
    def start(control_flag):
        # Create SyncThread to run the retry condition manager
    def stop(control_flag):
        # Shutdown the retry condition manager thread.
```

The condition evaluator 615 monitors for conditions associated with sync events using the functions substantially similar to the following:

```
def __init__(sync_event_retry_callback):
    def start(control_flag):
        # Override method with anything callable on start up
    def stop(control_flag):
        # Override method with anything callable on shut down
    def monitor_condition(sync_event, condition_details):
        # Monitor for condition associated with synchronization
        event
```

The condition evaluator 615 includes a communication condition evaluator, authentication condition evaluator, wait time condition evaluator, update event condition evaluator, a rate limit condition evaluator and/or a quota condition evaluator, each of which is briefly described below.

The communication condition evaluator can subscribe to appropriate file system status events for recognizing network up/down conditions. Since individual events do not need to be blocked, events can be put into the UNPROCESSED state and the sync execution controller can be notified to soft-pause processing of new sync events until the condition is satisfied. An example function encapsulated by the communication condition evaluator is substantially similar to:

```
def __init__(sync_event_retry_callback, fs_adapter_status_apis):
    # Subscribe to communication up/down notifications
```

The authentication condition evaluator can subscribe to appropriate file system status events for recognizing authentication configuration changes. If there is a change, an attempt to re-execute any blocked or failed synchronization events is made. Since individual events do not need to be blocked, events can be put into the UNPROCESSED state and the sync execution controller can be notified to soft-pause processing new synchronization events until this condition is satisfied. An example function encapsulated by the authentication condition evaluator is substantially similar to:

```
def __init__(sync_event_retry_callback, fs_adapter_status_apis):
    # Subscribe to authentication change notifications
```

The wait time condition evaluator can wake up and update the event to the UNPROCESSED state when the specified wait time has elapsed. The wait time can be specified as a 'wait_time' configuration in the condition_details. An example function encapsulated by the wait time condition evaluator is substantially similar to:
def_init_(sync_event_retry_callback):

The update event condition evaluator can monitor event state changes and update the synchronization event to UNPROCESSED state if a new event on the same item is added to the synchronization event queue. An example function encapsulated by the update event condition evaluator is substantially similar to:
def_init_(sync_event_retry_callback, subscribe_for_event_changes):

The rate limit condition evaluator can notify the sync execution controller to soft-pause processing any new synchronization events. When the elapsed rate limit delay expires the sync execution controller can resume processing new synchronization events. An example function encapsulated by the rate limit condition evaluator is substantially similar to:
def_init_(sync_event_retry_callback, subscribe_for_event_changes):

Since individual events do not need to be blocked, events can be put into the UNPROCESSED state and the sync execution controller can be notified to soft-pause processing new synchronization events until this condition is satisfied.

The quota condition evaluator can subscribe to appropriate file system status events for recognizing quota/storage configuration changes. If there is a favorable change (say user upgraded to more free space), it is assumed the system can attempt to re-execute any blocked synchronization events. If the free space is very small, the quota failure error can happen and it may make sense to block all events from being processed until the space is resolved. On the other hand if only an individual very large file failed, then it may not make sense to block all other files. An example function encapsulated by the quota condition evaluator is substantially similar to:

```
def __init__(sync_event_retry_callback, fs_adapter_status_apis):
    # Subscribe to authentication change notifications
```

Figure 7:
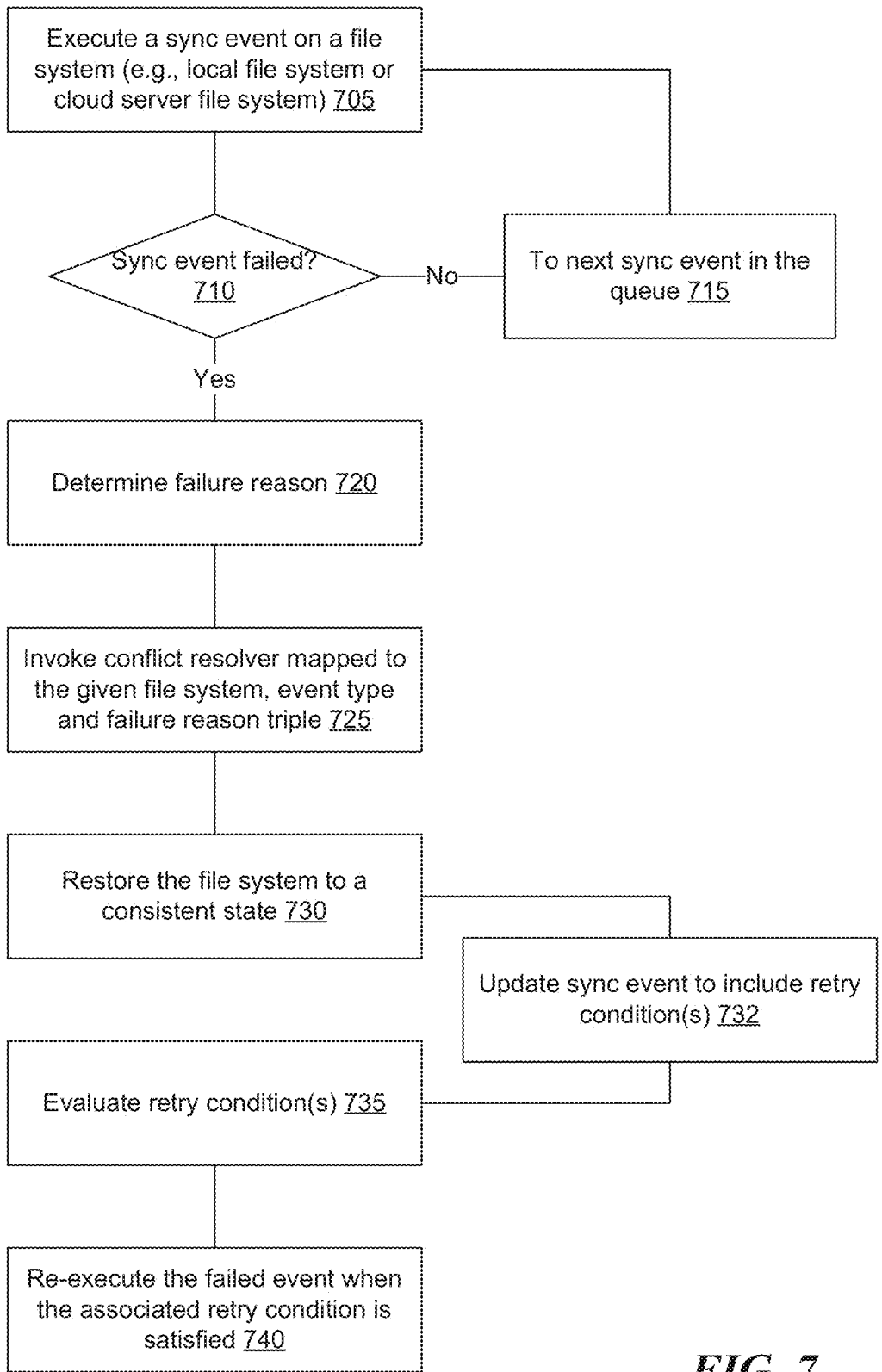
FIG. 7 illustrates a logic flow diagram depicting an example method of handling conflicts between incompatible changes made on opposite file systems.

FIG. 7 is a logic flow diagram illustrating an example method of handling conflicts between incompatible changes made on opposite file systems. The example method can be executed by a sync client on the client-side (sync client 400) or the server side (e.g., sync server 120). In one embodiment, the sync client executes a sync event on a file system at block 705. The sync event can be any event such as move, delete, edit, create, rename or the like and can be with respect to a file or a folder. If the sync event executes successfully by completing the requested action without causing the file system on the opposing side to be inconsistent, as determined at decision block 710, the next sync event in the sync event queue is executed at block 715.

On the other hand, if the sync event failed as determined at decision block 710, the sync client determines the failure reason at block 720. Based on the event type, file system and failure reason triple, the sync client invokes a conflict resolver mapped to the triple at block 725 to resolve the conflict that caused the sync to fail. At block 730, the sync client via the conflict resolver restores the file system to a consistent state by taking one or more actions on the file system. In one embodiment, the conflict resolver (or another component in the sync client) associates or updates the sync event to include one or more retry conditions at block 732. At block 735, the sync client evaluates or monitors retry conditions. When the retry conditions are met, at block 740, the sync client re-executes the event. In one embodiment, the re-executing the event includes updating the status of the event to "unprocessed" and putting the "unprocessed" sync event in the sync event queue for execution.

5. Conflict Resolution Rules

Various rules and conflict resolution schemes utilized by the sync client 400 will now be described. In one embodiment, one or more rules can be utilized for conflict resolution. These rules can be specific to files (i.e., file rules), specific to folders (i.e., folder rules) or rules that are applicable to both files and folders (e.g., global rules).

Table 1 below file rules for reconciling two actions (i.e., an action on the cloud server or collaboration platform server and an action locally) on the same file ID.

TABLE 1

File rules for reconciling actions on a local file system and on cloud server file system

|  |  | Local | | | |
|---|---|---|---|---|---|
|  |  | Delete | Rename | Move | Edit |
| Cloud Server | Delete | Delete | Delete | Delete | Restore original file & upload |
|  | Rename | Delete | Cloud server rename wins | Apply both | Apply both |
|  | Move | Delete | Apply both | Cloud server move wins | Apply both |
|  | Edit | Cloud server wins, download new file | Apply both | Apply both | Local edit renamed as a copy |

Inter-item collisions can occur when files have same names but different file IDs. Table 2 below summarizes the rules for treating local files that are changed between syncable and unsyncable states. Files with unsyncable states are hidden or system files and such files are not synced to the cloud server. Changing the state of a file from unsyncable to syncable is the same as a new file create. The rules illustrated in Table 2 are also applicable for treating name collisions between two files with different file IDs. For example, "fileA" is locally renamed to "fileB" and "fileB" exists on the cloud server.

TABLE 2

File rules for reconciling name conflicts and change in syncable or unsyncable status

| Local: Before | Local: After | Name conflict with cloud server file? | Result |
|---|---|---|---|
| Syncable | Syncable | Yes | Cloud server wins Local file renamed as a copy |
|  |  | No | File syncs |

TABLE 2-continued

File rules for reconciling name conflicts and change in syncable or unsyncable status

| Local: Before | Local: After | Name conflict with cloud server file? | Result |
|---|---|---|---|
|  | Unsyncable | Yes | Cloud server file is marked as unsyncable file on cloud server and is not synced. Instead, it will be shown in the alerts table. |
|  |  | No | Original file deleted on cloud server Local file no longer synced |
| Unsyncable | Syncable | Yes | Cloud server wins Local file renamed as a copy |
|  |  | No | File syncs |
|  | Unsyncable | Yes | Cloud server file is marked as unsyncable file on cloud server and is not synced. Instead, it will be shown in the alerts table. |
|  |  | No | No change |

Table 3 below lists example rules that are applicable to folders stored locally or on the cloud server.

TABLE 3

Folder rules for reconciling files deleted locally or on the cloud server

|  |  | Local | | |
|---|---|---|---|---|
|  |  | Delete | Rename | Move |
| Cloud Server | Delete | see Table 4 | If there are no dirty local files, delete the entire folder. If there are dirty local files, delete everything except for the dirty files. Mark folder and dirty files as problem items. | |
|  | Rename |  | Cloud server rename wins | Apply both |
|  | Move |  | Apply both | Cloud Server move wins |

Table 4 below lists folder rules, resolution of the rules and any output or notification on the user interface.

TABLE 4

Folder rules for conflict resolution and user interface notifications

| Rule Type | Resolution | User Interface (UI) |
|---|---|---|
| Local Delete | Options: 1. Prompt the user with a popup whether or not to delete or unsync the folder (unsync can be set as default) 2. Always unsync the folder | |
| Cloud Server Delete | If there are dirty/problem files locally, do not delete - instead mark as problem items. Delete all other files. Treat as a permanent failure. | List in "alerts" table Notification Files/folder marked as problem items |
| Local Move | If move is not allowed on cloud server, attempt to move it back. If there are any issues, bubble up as problem files. If move is to outside "My Box Files", see "Local Delete" | Notification |
| Access removed on Cloud | If permissions are reduced on cloud server, so the folder cannot be synced - or if the collaboration is removed altogether, treat as | See Cloud Server Delete. |

TABLE 4-continued

Folder rules for conflict resolution and user interface notifications

| Rule Type | Resolution | User Interface (UI) |
|---|---|---|
| Server Name | a cloud server delete. If a local move/rename cannot be executed on Cloud Server, because the folder already exists, rename the local move/rename as a copy in the destination location. Still continue to sync the folder. | Notification |

Table 5 below lists example rules for resolving conflicts relating to read-only sync or locked files and files in a folder that have "viewer" or "viewer uploader" cloud server permissions.

TABLE 5

Rules for resolving local changes to read-only sync/locked files

| Local Change | Resolution | UI |
|---|---|---|
| Create file | Mark file as problem item (* does not apply for viewer-uploader folder) | List in "alerts" table Notification |
| Modify | Rename the local edit as a copy. Re-download original file. Mark copy as problem item. | Local edit renamed as a copy List in "alerts" table Notification |
| Rename | Rename the file back | Notification |
| Move | Move the file back | Notification |
| Delete | Move the file back | Notification |

If there are unsyncable files on the cloud server (e.g., PST files), these unsyncable files can be shown in the alerts table. Some operating system/platforms may support a set of characters that are not supported by other operating systems/platforms. For example, certain such as \ *?":< >| are supported on MAC platforms but not on Windows based platforms. In one embodiment, rather than mark files containing these characters as unsyncable files, the system maintains a character mapping so that all illegal characters on Windows can be mapped to a character that is supported on Windows (e.g. rename all illegal characters on Windows to "_" and maintain a mapping).

In the above rules, "local renamed as a copy" means:
1. Rename the %filename%. %ext% to %filename% (%username%). %ext%
2. If %filename% (%username%). %ext% already exists, rename to %filename% (%username% 2). %ext%
3. Etc.

The username can be the cloud server username of the local user. In the event of overlapping collaboration, i.e., when there are two folders on the cloud server marked for sync with the same name, similar rules should be followed:
1. Rename the second folder locally as %foldername% to %foldername% (%username%)
2. If %foldername% (%username%) already exists, rename to %foldername% (%username% %2)
3. Etc.

This should generally be done locally. In other words, the folder name should not be synced up to the cloud server, and sync can be responsible for keeping a mapping.

Table 6 below lists results and corresponding notifications or other indications generated for display on a user interface.

TABLE 6

Notifications and Alerts for Sync Results

| Result | Notification? | Problem Icon? | Alerts Table? |
|---|---|---|---|
| Local file/folder renamed as a copy | YES | NO | NO |
| Unsyncable/deleted folder with dirty files | YES | YES | YES |
| Move back illegal folder move | YES | NO | NO |
| Read-only sync: Unsyncable file (from modify or create) | YES | YES | YES |
| Read-only sync: Rename file back | YES | NO | NO |
| Read-only sync: Move file back | YES | NO | NO |
| Unsyncable files on Cloud server | YES | NO | YES |

6. Ignored and Problem Files

Although the sync architecture is about synchronization of files and folders between a local machine and a cloud server, there are some files and/or folders that should not be synchronized. Such files and folders that should not be synced are herein referred to as "ignored items" or "problem items" and can include, by way of example, temporary or hidden files, symbolic links, and a handful of other special files or folders. The disclosed system includes a component that identifies those ignored items and keeps them out of the synchronizing process.

The disclosed system has the ability to flag the appropriate items as "ignorable". This is a static definition. This is not an end user feature allowing for ad hoc tagging of items as ignored, either locally or via the cloud server. And this is not used to tag files that fail to synchronize for some reason. The disclosed system can exclude these "ignored" items from synchronization. This works in both directions, by preventing ignored local files from moving to the cloud server and preventing ignored cloud server files from moving to local. The system can also handle transitions between "ignorable" and "syncable" for a given item, effectively by either creating or deleting the file in question. The disclosed system can provide the information necessary to support the sync user experience. This can be achieved through "ignored item" notifications sent to all registered components, similar to notifications triggered by the SEQ.

Example types of items that can be ignored include, but are not limited to: hidden (files only), system (files only), temporary, links (shortcuts, symbolic links, aliases, or the like), web based files (these are cloud server files), and/or the like.

In one embodiment, the system can normalize platform specific behavior, defining a single notion of what is an ignorable item. For example, all files beginning with a '.' (dot) can be treated as hidden, regardless of the platform. If an item exists on the cloud server that would be flagged as ignored were it to be pulled down, that item will be treated as "ignored," and thus it will not be synced to local. For example, a cloud server file called ".Happy Days" will not be synced because files beginning with a '.' are considered hidden and are to be ignored. In one embodiment, hidden or system folders can be synced (i.e., not flagged as "ignorable"). Hidden or system files, on the other hand, can be marked as "ignorable."

The component configured to detect problem items and prevent such items from synchronizing can live within the file system adapter's pipeline component (e.g., on both local and cloud server). In one example implementation, the process outlined below can be used to tag certain sync events as "ignorable" and take an appropriate action.

Raw_events enter the file system adapter pipeline.

In the local pipeline only, the file system attribute information is added to raw_events.

Raw_events flow through the filter pipeline as normal.

Raw_events are translated to sync_events.

A filter tags "ignorable" sync_events using one or more business rules.

A filter does one of three things to sync events involving ignorable items:

(1) "ignorable→syncable"—rewritten as a CREATE
(2) "syncable→ignorable"—rewritten as a DELETE
(3) "ignorable→ignorable"—event is discarded The above outlined process, with slight variations can exist in both local and the cloud server. The server-side can be based off file naming conventions.

Item State has a new property of syncability. The corresponding ItemSyncability enum (enumeration) can have the following values: SYNCABLE, IGNORABLE or PROBLEMATIC. An item whose item_state.syncability property has a value of IGNORABLE indicates that this item is "ignorable".

The local file system adapter uses API and other filters to implement detection and handling of "ignorable" items. For example, the Mac and Windows version of an extended API (get_file_info_from_path( )) can be extended to return all file attribute information pertaining to the ignored item feature. For example, for Mac (via objc API), the following attribute can be returned:

---
'hidden' attribute (kLSItemInfoIsInvisible)
'alias' attribute (kLSItemInfoIsAliasFile)
---

Similarly, for Windows, the following attributes can be returned:

---
'hidden' attribute
'system' attribute
---

The local file system adapter also includes one or more filters through which the raw_events flow. The LocalPopulateFileSystemStateFilter pulls the attribute information determined above (e.g., using API) and places the information in the raw_event. The Tag Ignored Item Filter sets the item_state syncability property to IGNORABLE as appropriate. The filter can apply both the naming convention rules and look at the attributes associated with the file. The Ignored Item Rewrite Filter can perform any one of the following comparisons, between "before" and "after" state of the item:

(1) "syncable→syncable" or technically: [syncable|no-state]→syncable.
The filter does not touch these and the events are passed along.

(2) "ignorable→ignorable" or technically: [ignorable|no-state]→ignorable)
The filter causes a notification to be sent to registered handlers that this item is being ignored. The event is then discarded and it never reaches the Sync Event Queue.

(3) "ignorable→syncable"
This transition can happen due to moves or edits (e.g. file attributes changed). The filter rewrites the event as a CREATE and the event is passed along.

(4) "syncable→ignorable"
This transition can happen due to moves or edits (e.g. file attributes changed). The filter rewrites the event as a DELETE and the event is passed along.

The item and its item_state can be placed into the shadow, thus allowing the filter, on subsequent events to compare old and new states, to determine the transitions called out above.

The cloud server file system adapter includes a pipeline component ("server pipeline"). In an embodiment, the logic in the server pipeline is similar to the local pipeline. For example, the cloud server file system adapter includes a Tag Ignored Item Filter. In an embodiment, this filter is a simplified version of the local filter. The file naming rules can be used to set the IGNORABLE flag. The Ignored Item Rewrite Filter in the server pipeline is similar to the local filter counterpart and can perform comparisons such as:

(1) "syncable→syncable"—The filter simply passes the event along.
(2) "ignorable→ignorable"—The filter discards the event and sends a notification.
(3) "ignorable→syncable"—The filter rewrites the event as a CREATE.
(4) "syncable→ignorable"—The filter rewrites the event as a DELETE In an alternate embodiment, sync events for ignored items can flow into the sync event queue. This can leverage existing logic for getting an item's sync status into the IconManager/Iconizer and logic for dropping various sync events for "ignored" items. The notion behind the file system adapters and the filter/pipeline includes normalizing the stream of events coming from local (or server)—to filter out the noise, the platform specifics, or the like. Atomic save transformation can happen in the pipeline, expansion of cloud server raw_events into multiple sync_events happens in the pipeline. Handling ignorable files (hidden files, aliases, or web-based documents) in the file system adapters is a good fit.

In some cases, it may not be possible to sync some files/folders due to either a) system limitations or b) unanticipated error conditions. If so, these errors should be bubbled up to the user so they're aware that their content is not synced and can take corrective actions when possible.

Each time a new problem file/folder is discovered, it can be displayed as a notification (e.g., system tray on Windows, Growl on Mac or on a user interface via notification engine 466). In one embodiment, a problem file can include and identify the following example properties:

Name: The name of the file
Description: A description of the issue
Error Code: Unique code that identifies the issue
Link to Support Article: Each error code can map to a Support article where the user can learn more about the issue and possible remedies
Option to Ignore: Ignoring the issue will take it off the a) list of problem files and b) count under the menu bar/system tray icon. It may not remove the problem file icon in Windows Explorer/Finder.

Note: "ignores" may or may not be persisted across Sync restarts depending on implementation.

In the case that the files in the same folder have the same error code, this can be bubbled up to the problem files list as one item for optimization. The dropdown from the menu bar/system tray icon can indicate the number of problem files. If clicked, the list of problem files open. When a problem file is ignored, it generally does not count towards this list. When a problem file is identified, it can be indicated with a special icon in Windows Explorer/Finder. Even if the file is "ignored" in the problem files UX, it can still be marked with this icon.

Table 7 below lists examples of ignored and problem file types and example methods for processing such files.

TABLE 7

Examples of ignored and problem file types and processing methods

| Type | CLOUD SERVER-> Local | Local -> CLOUD SERVER |
|---|---|---|
| Web-based files<br>.webdoc<br>.gdoc<br>.gsheet | Ignored, do not mark as problem file<br>Show these files as links to the web content | Not allowed, show in problem files |
| Banned files<br>.pst<br>.qbw<br>.nd<br>.qbw.tlg<br>.des<br>.qba<br>.qba.tlg<br>.qbr<br>.qby<br>.qbi<br>.qdt | Not allowed, show in problem files | Not allowed, show in problem files |
| Windows illegal characters<br>\ /*?":<>\| | Windows: Generally Not allowed, show in problem files<br>Mac: Allowed<br>Illegal character mapping can be used on Windows to download files | Windows: Impossible<br>Mac: Allowed |
| Windows Illegal Folder<br>Folder ending with "." | Windows: Not allowed, show in problem files<br>Mac: Allowed | Windows: Impossible<br>Mac: Allowed |
| Windows Illegal Filenames<br>CON, PRN, AUX, NUL, COM1, COM2, COM3, COM4, COM5, COM6, COM7, COM8, COM9, LPT1, LPT2, LPT3, LPT4, LPT5, LPT6, LPT7, LPT8, and LPT9 | Windows: Not allowed, show in problem files<br>Mac: Allowed | Windows: Impossible<br>Mac: Allowed |
| Hidden/system files<br>Files with hidden filesystem metadata flag set, files that start with (.) on Mac, desktop.ini, thumbs.db, | Ignored, do not mark as problem file | Ignored, do not mark as problem file |
| Large files<br>Ex: >100 MB personal accounts, >5 GB enterprise accounts | Not allowed, show in problem files | Not allowed, show in problem files |
| Long paths<br>Ex: >256 characters on Windows | Support this scenario. Make sure file watcher works as expected. | Supported. File watcher works as expected. |
| Mac packages | Generally Impossible | Windows: Generally Impossible<br>Mac: Not allowed, show in problem files<br>Option: Sync these files to Cloud server |
| Shortcuts<br>Softlinks, shortcuts, hardlinks, aliases, .lnk files | Ignored, do not mark as problem file | Ignored, do not mark as problem file |
| Temporary files<br>Filenames beginning with ~, filenames ending in .tmp | Ignored, do not mark as problem file | Ignored, do not mark as problem file |
| Zero byte files | Allowed, sync these | Allowed, sync these |
| Hidden/system folders | Allowed, sync these | Allowed, sync these |

7. Example Systemization

Figure 8:
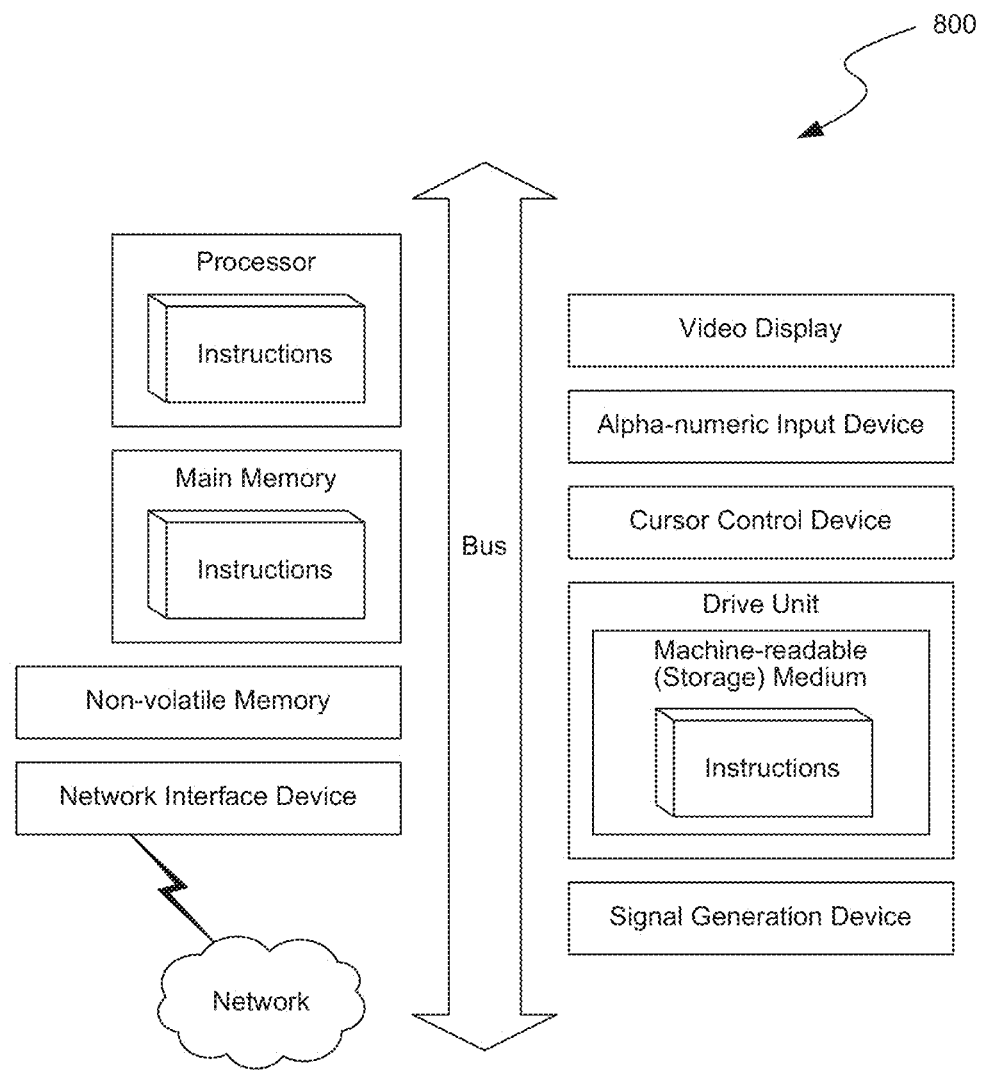
FIG. 8 illustrates a diagrammatic representation of a machine in the example form of a computer system within which a set of instructions for causing the machine to perform any one or more of the methodologies discussed herein, may be executed.

FIG. 8 shows a diagrammatic representation of a machine in the example form of a computer system within which a set of instructions for causing the machine to perform any one or more of the methodologies discussed herein, may be executed.

In the example of FIG. 8, the computer system 800 includes a processor, main memory, non-volatile memory, and an interface device. Various common components (e.g., cache memory) are omitted for illustrative simplicity. The computer system 800 is intended to illustrate a hardware device on which any of the components depicted in the examples of FIGS. 4A-4D and 6 (and any other components described in this specification) can be implemented. The computer system 800 can be of any applicable known or convenient type. The components of the computer system 800 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, refer to the action and processes of a computer system, or similar electronic computing device that manipulates and transforms data represented as physical (electronic) quantities within the computer system's registers and memories into other data similarly represented as physical quantities within the computer system memories or registers, or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instruction sets at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs)), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements, and the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, which are not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in their implementation, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors may contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

What is claimed is:

1. A processor-implemented method of resolving conflicts in a synchronization system, comprising:
    mapping, by a synchronization server, each of a plurality of different conflict resolvers to a different plurality of attributes, each plurality of attributes comprising each of an event type attribute, a file system attribute, and a failure reason attribute;
    detecting, by the synchronization server, a conflict when executing, by the synchronization server, a sync event on a local file system on a client device and a cloud server file system, wherein the conflict is detected based on a failure when executing the sync event;
    responsive to detecting the conflict, identifying, by the synchronization server, a plurality of attributes associated with the sync event, wherein the plurality of attributes associated with the sync event comprises each of a file system identifier for the sync event, an event type associated with the sync event, and a failure reason associated with the sync event; and
    taking an action on the local file system on a client device or the cloud server file system to resolve the conflict, wherein the action is associated with a conflict resolver selected from the plurality of conflict resolvers based on the plurality of attributes mapped to the selected conflict resolver matching the identified set of attributes associated with the sync event and wherein the action includes modifying one of the local file system on the client device or the cloud server file system, associating a retry condition to the sync event, or a combination thereof.

2. The method of claim 1, wherein changes to the local file system on the client device and cloud server file systems that cause the conflict occur in parallel.

3. The method of claim 1, further comprising:
    in response to determining that the retry condition has been satisfied, executing the sync event on the local file system on the client device.

4. The method of claim 3, wherein the retry condition is satisfied when another sync event updates an item associated with the sync event.

5. The method of claim 3, wherein the retry condition is satisfied after a period of time elapses.

6. The method of claim 1, wherein the event type attribute associated with the sync event identifies one or a create event, rename event, move event, edit event or delete event that changes the second file system.

7. The method of claim 6, wherein the failure reason attribute associated with the sync event indicates one of: item not found, item name in use, item name not valid, item name too long, item locked or version mismatch.

8. A synchronization system with conflict resolution, comprising:
    a synchronization component configured to execute sync events;
    a plurality of conflict resolvers, wherein the plurality of conflict resolvers are different and mapped to different corresponding plurality of sync event attributes, wherein each conflict resolver is configured to resolve a conflict identified by a matching plurality of sync event attributes associated with a sync event by making changes to a file system, wherein the plurality of sync event attributes comprises each of a file system identifier of the file system, an event type associated with the sync event, and a failure reason associated with the sync event; and
    a sync execution controller to update the sync event to include a retry condition.

9. The system of claim 8, wherein the file system that is changed is one of a cloud server file system of a cloud server or local file system of a client device.

10. The system of claim 8, further comprising a sync failure detector that detects the conflict based on at least one result from execution of the sync event.

11. The system of claim 8, further comprising a retry condition evaluator to monitor and determine when the retry condition is satisfied.

12. The system of claim 11, further comprising a retry condition manager that sends the sync event for re-execution when the retry condition is satisfied.

13. The system of claim 8, further comprising an ignored items detector configured to detect an ignored item and exclude the item from synchronization.

14. A processor-implemented method of conflict resolution, comprising:
    mapping, by a synchronization server, each of a plurality of different conflict resolvers to a different plurality of attributes, each plurality of attributes comprising each of an event type attribute, a file system attribute, and a failure reason attribute;
    executing, by the synchronization server, a sync event on a local file system on a client device and a cloud server file system;
    detecting, by the synchronization server, a conflict when executing the sync event on the local file system on a client device and the cloud server file system;
    responsive to detecting the conflict, identifying, by the synchronization server, a plurality of attributes associated with the sync event, wherein the plurality of attributes associated with the sync event comprises each of a file system identifier for the sync event, an event type associated with the sync event, and a failure reason associated with the sync event;
    taking an action associated with a conflict resolver selected from the plurality of conflict resolvers based on the plurality of attributes mapped to the selected conflict resolver matching the identified set of attributes associated with the sync event, wherein the action includes restoring the local file system on a client device and the cloud server file system to a consistent state;
    associating a retry condition with the sync event when the conflict is detected;
    monitoring the retry condition associated with the sync event; and
    re-executing the sync event when the retry condition associated with the sync event is satisfied.

15. A synchronization system with conflict resolution, comprising:
    a memory;
    a processor disposed in communication with the memory and configured to execute a plurality of instructions stored in the memory to:
        map each of a plurality of different conflict resolvers to a different plurality of attributes, each plurality of attributes comprising each of an event type attribute, a file system attribute, and a failure reason attribute;

detect that a synchronization operation failed due to a conflict, wherein the conflict is caused by incompatible changes made to a local file system and a cloud server file system;

responsive to detecting the conflict, identify a plurality of attributes associated with the sync event, wherein the plurality of attributes associated with the sync event comprises each of a file system identifier for the sync event, an event type associated with the sync event, and a failure reason associated with the sync event; and resolve the conflict by taking at least one action associated with a conflict resolver selected from the plurality of conflict resolvers based on the plurality of attributes mapped to the selected conflict resolver matching the identified set of attributes associated with the synchronization operation failure, wherein the at least one action that is taken depends on the identified set of attributes associated with the synchronization operation failure, wherein when the incompatible changes causing the conflict include creation of a file having the same name on both the local file system and the cloud server file system, the reason for the synchronization operation failure is identified as item name in use, and wherein the at least one action taken to resolve the conflict includes renaming the file to have a new name both on the local file system and the cloud server file system.

16. The system of claim 15, wherein the action taken to resolve the conflict repairs one of the local file system or the cloud server file system to make the file systems consistent.

17. The system of claim 15, wherein when the synchronization operation is executed on opposing file systems, a sync result that identifies the reason for the synchronization operation failure is generated.

18. The system of claim 15, wherein the at least one action further comprises retrying the synchronization operation that failed when a specified condition is satisfied.

19. The system of claim 15, wherein when the incompatible changes causing the conflict include renaming of a same file on both the local file system and the cloud server file system to different names, the reason for the synchronization operation failure is identified as version mismatch.

* * * * *